United States Patent [19]

Buehring et al.

[11] Patent Number: 5,517,307
[45] Date of Patent: May 14, 1996

[54] PROBE MEASUREMENT APPARATUS USING A CURVED GRATING DISPLACEMENT INTERFEROMETER

[75] Inventors: Ian K. Buehring; Daniel Mansfield, both of Leicester, United Kingdom

[73] Assignee: Rank Taylor Hobson Limited, United Kingdom

[21] Appl. No.: 157,011

[22] PCT Filed: May 29, 1992

[86] PCT No.: PCT/GB92/00975
    § 371 Date: Nov. 30, 1993
    § 102(e) Date: Nov. 30, 1993

[87] PCT Pub. No.: WO92/21934
    PCT Pub. Date: Dec. 10, 1992

[30] Foreign Application Priority Data

May 30, 1991 [GB] United Kingdom ............... 9111657

[51] Int. Cl.[6] .................................................. G01B 9/02
[52] U.S. Cl. ...................................... 356/356; 250/237 G
[58] Field of Search ........................... 356/356, 357, 356/363, 351; 250/237 G, 321.14, 231.16

[56] References Cited

U.S. PATENT DOCUMENTS

| | | | |
|---|---|---|---|
| 3,419,330 | 12/1968 | Schneider | 356/350 |
| 3,726,595 | 4/1973 | Matsumoto | 356/356 |
| 3,756,723 | 9/1973 | Hock . | |
| 4,699,300 | 6/1987 | Hall et al. . | |
| 4,717,255 | 1/1988 | Ulbers | 356/356 |
| 4,744,661 | 5/1988 | Ulbers et al. | 356/356 |
| 4,998,798 | 3/1991 | Ishizura et al. | 356/356 |
| 5,000,572 | 3/1991 | Nose et al. | 356/356 |
| 5,063,291 | 11/1991 | Buehring | 250/231.16 |
| 5,235,406 | 8/1993 | Ishii et al. | 356/356 |

FOREIGN PATENT DOCUMENTS

| | | |
|---|---|---|
| 0242407 | 4/1986 | European Pat. Off. . |
| 0242436 | 10/1986 | European Pat. Off. . |
| 2075408 | 11/1971 | France . |
| 2085156 | 9/1981 | United Kingdom . |
| 2201509 | 10/1987 | United Kingdom . |
| 2205942 | 5/1988 | United Kingdom . |
| 2239088 | 6/1991 | United Kingdom ................. 356/356 |

OTHER PUBLICATIONS

M. DeRo, "The Magnetic Exciter as Applied to Active Damping of Machine Tools", Proceedings of the 9th Conference of Machine Tool Development and Research, Birmingham, England pp. 621–633 (1968).

Katinas et al., "Active Vibration–Suppression Techniques for Mechanical Systems with Many Degrees of Freedom", Sov. Phys. Acoust., vol. 23, No. 3 pp. 273–274 (May 1977).

Primary Examiner—Samuel A. Turner
Attorney, Agent, or Firm—Lerner, David, Littenberg, Krumholz & Mentlik

[57] ABSTRACT

Apparatus for surface measurement has a grating interferometer with a curved diffraction grating carried on a pivotal support arm of a probe for contacting a surface. The probe is biased into contact with a surface by an electromagnetic coil acting on an armature, or a pair of such biasing arrangements. A laser diode illuminates the grating to produce a pair of first order diffracted beams of opposite sign which are reflected from internal faces of a prism, and combined by a diachronic central layer of the prism and a pair of beam splitters. Output signals from the beam splitters are supplied to a signal processing circuit having a fringe counter and an interpolator. The fringe counter detects zero crossings of the signals and the interpolator maintains a digital estimate of the phase of the signals and updates the estimate when the phase difference between the estimate and the input signals exceeds a predetermined threshold. The interpolator has a digital counter for providing low order bits of the digital output signal. The output of the fringe counter provides the high order bits.

44 Claims, 21 Drawing Sheets

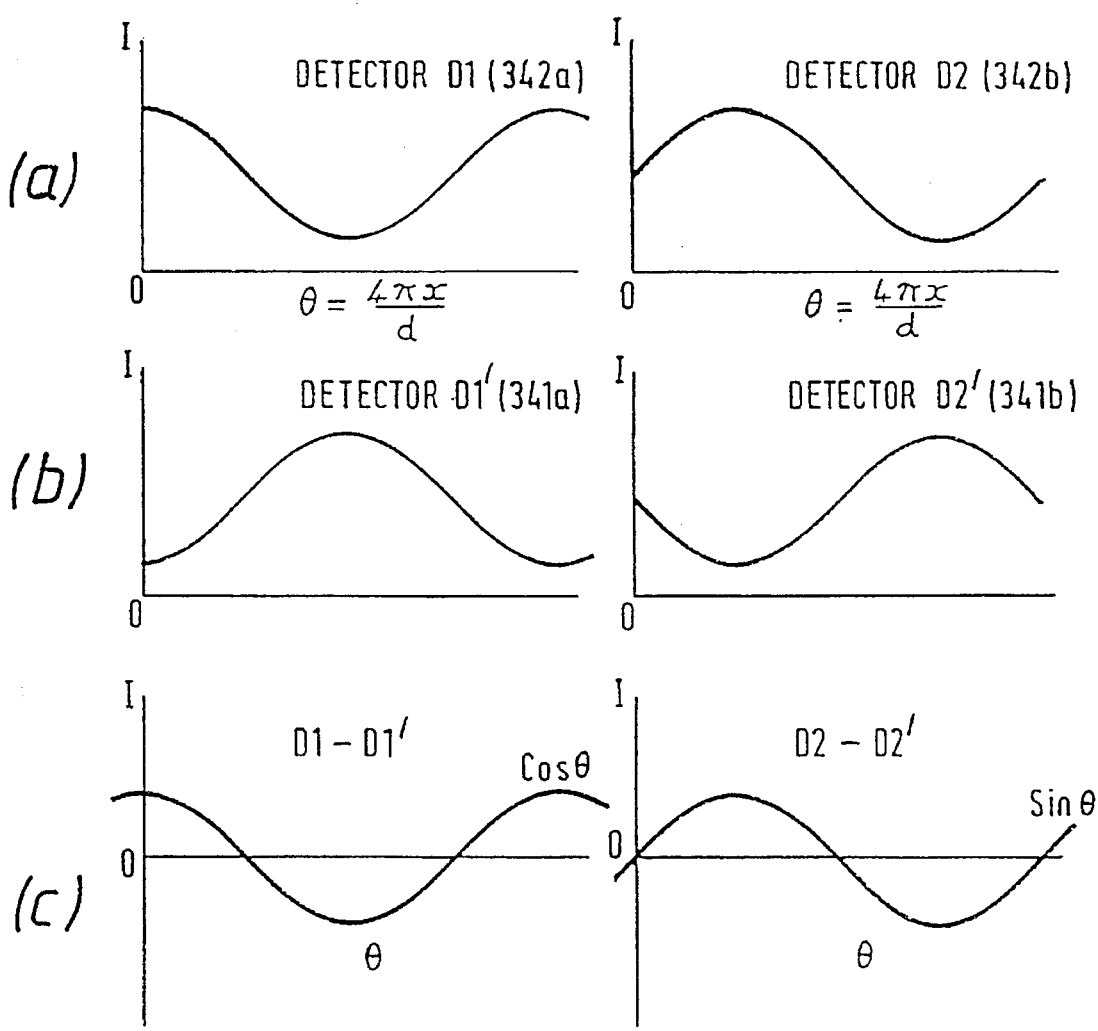

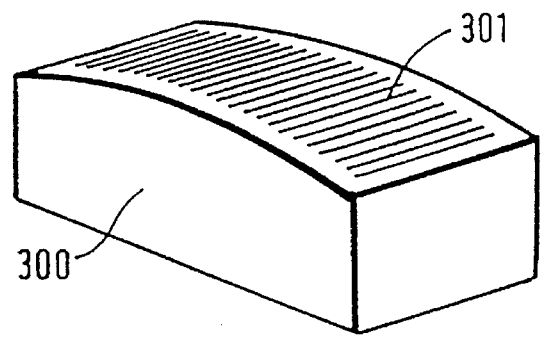
FIG. 10
FIG. 11
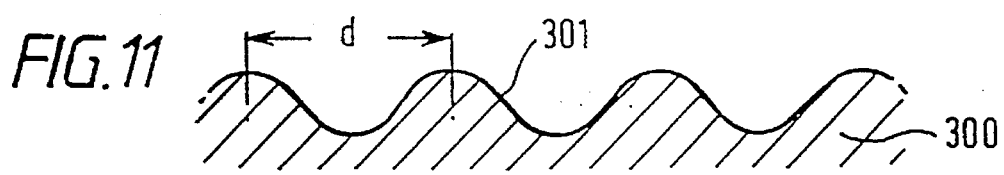
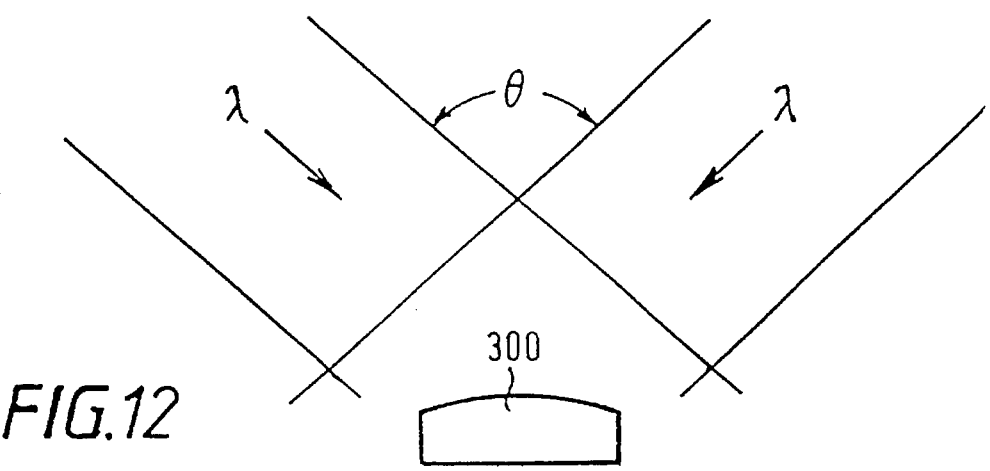
FIG. 12
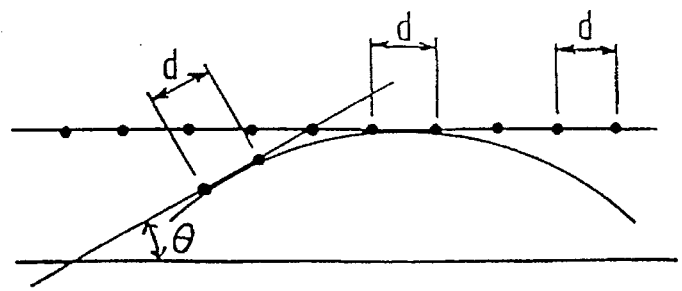
FIG. 13

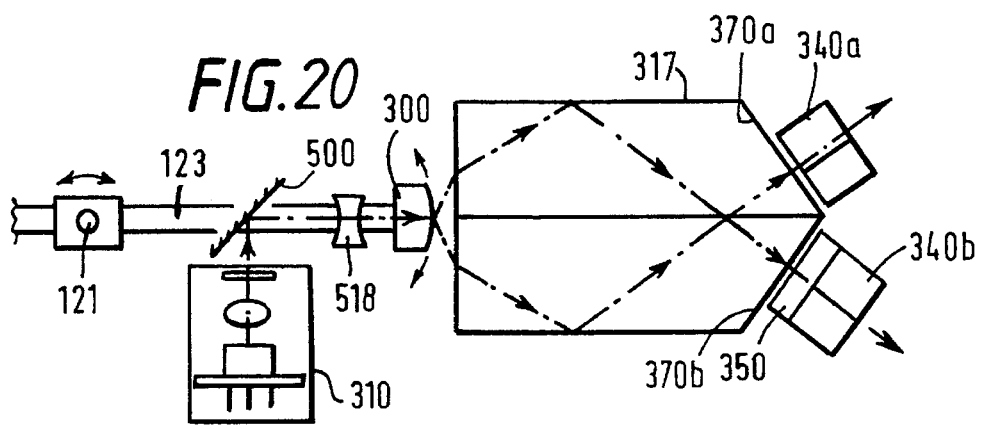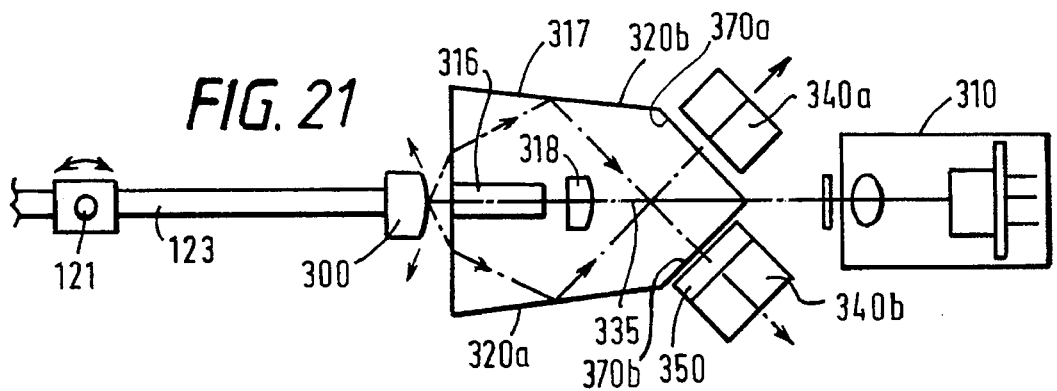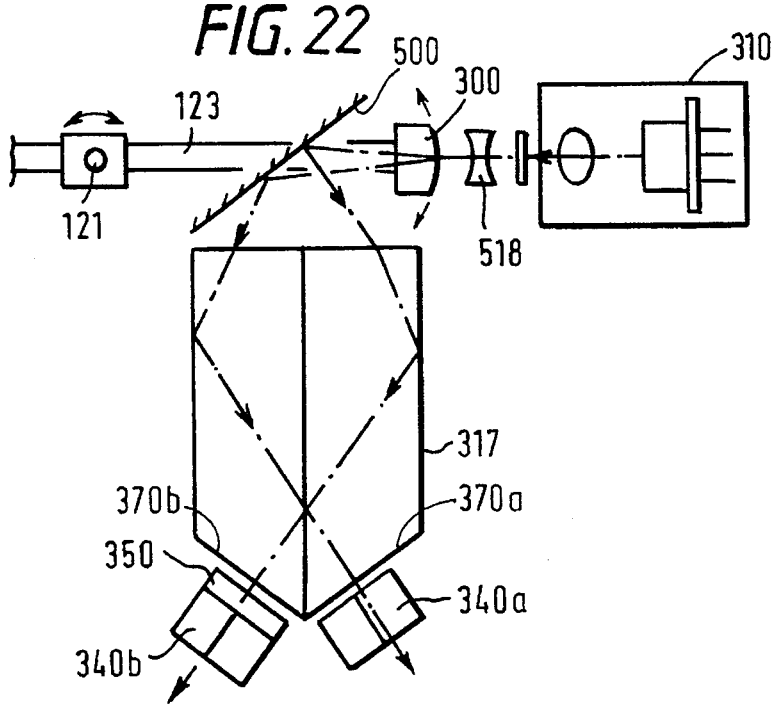

INTERPOLATOR IS FORCED TO CHANGE TO ZERO FROM 255
AT THE SAME INSTANT AS CCK UPDATES THE FRINGE COUNTER 600

PROBE MEASUREMENT APPARATUS USING A CURVED GRATING DISPLACEMENT INTERFEROMETER

FIELD OF THE INVENTION

This invention relates to apparatus for measuring surfaces and profiles using interferometry. This invention relates also to a method and apparatus for determining displacement, for example, of a probe over such a surface or profile, from the output from an interferometer.

BACKGROUND OF THE INVENTION

It is known to provide apparatus for measuring the surface or the profile of an object, to derive the texture or roughness or shape thereof. One example of such apparatus is the FORM TALYSURF™ measuring system available from Rank Taylor Hobson Limited, P O Box 36, 2 New Star Road, Leicester LE4 7JQ, UK. That apparatus comprises a probe member, or stylus, projecting downwardly to contact the surface to be measured and provided adjacent one end of a supporting arm mounted pivotally to a supporting structure.

The supporting structure is mounted for linear motion parallel (or approximately so) to the surface of the object to be measured, and is moved across the surface in a line by a drive system. The supporting arm extends beyond the pivotal mounting and carries a reflective surface defining one end of one of two optical paths along which a collimated light source (a laser) is directed.

At a reference probe position above the surface, the two path lengths are equal. When the surface height varies, however, the probe is urged by gravity to follow the surface and the reflective surface at the other end of the pivoted support arm travels, changing the optical path length of one of the paths and thus generating a fringe pattern of interference.

Counting the number of fringes which pass a given optical detector position provides a measure of the displacement of the probe. Fringe counting apparatus is therefore provided to continually count the fringes passing a fixed detector position and to provide therefrom an output signal representing the probe displacement above the surface to be measured whilst the probe structure is moved linearly across the surface. It would, of course, be equally possible to move the surface, rather than the probe.

To provide a measurement of the roundness or profile of a rotatable object such as a crank shaft or an axle, the object is positioned beneath the stylus and mounted to be rotatably driven. As the object rotates, the probe measures the circumference of the object, from which any eccentricity or deviation from a desired profile can be detected.

Such measuring apparatus is required to have extremely high accuracy in measuring the probe position (and hence the height of the surface). The above described apparatus can achieve a displacement resolution on the order of 10 nm. Another important property of such apparatus is the maximum displacement which the stylus can measure; this needs to be reasonably large for measurement of many types of surface or profile, and typically on the order of millimeters. A useful measure of the performance of such measurement equipment is the "dynamic range", defined as range R(mm)/resolution R(mm). This should preferably be as high as possible.

Whilst the measuring apparatus above provides excellent performance, a number of problems can arise. Firstly, the Michelson type interferometer used measures the difference in optical path length between the two optical paths provided. It depends critically upon a stable light wavelength, whereas changes in atmospheric pressure and temperature can cause changes in the wavelength of light and hence lead to incorrect measurements. Since the two optical paths can have widely differing lengths, the light source must have a very long coherence length; providing a suitable light source thus requires an expensive and bulky type of laser, requiring a high voltage supply and involving considerable dissipation of heat.

U.S. Pat. No. 3,726,595, FIG. 8-1, shows a surface measurement apparatus which employs instead a grating interferometer. In a grating interferometer, a light beam illuminates a grating and is diffracted thereby to produce a pair of first order diffracted beams (although higher orders could be used). The two beams are reflected so as to travel equal path lengths and are recombined to provide an interference pattern. When the grating moves laterally, the path of each beam remains constant but the phase of each beam is changed, so that the fringes of the interference pattern are shifted. The motion of the fringes therefore provides a measure of the lateral motion of the grating.

In U.S. Pat. No. 3,726,595, the grating is positioned normal to a surface and carries a probe at its surface engaging end, so that when the interferometer is moved laterally along the surface the grating is forced to move normal to the surface and the resulting variation in the interference pattern gives a measurement of the probe position.

Inherent in the nature of this apparatus is the necessity that the grating should be constrained to move purely linearly, transverse to the illuminating beam and to the line bisecting the two diffracted order beams. However, in the measurement of rough or irregular surfaces or, in general, surfaces which include rising edges encountered by the probe, this method of mounting the probe would be unsatisfactory since when the probe were pulled into contact with such a rising edge, compressive stress within the probe would be set up as the probe moved over the edge and this would, firstly, tend to shift the alignment of the grating (disrupting the interference pattern), and secondly tend to cause the probe to vibrate due to the increased friction with the surface. It would also tend to put increased stress on the probe mounting.

SUMMARY OF THE INVENTION

We therefore provide, according to one aspect of the invention, a surface or profile measuring apparatus incorporating a grating interferometer a part of which is connected to a pivotally mounted probe.

However, in directly realising such apparatus a problem arises; for example, if the apparatus shown in U.S. Pat. No. 3,726,595 were arranged so that the grating/probe were provided on a pivoted arm, the inclination of the grating would rotate as the probe, and hence grating, rose and fell over the surface. This rotation would either prevent diffraction altogether or displace the direction of the diffracted beams, both of which would render the device ineffective.

In this aspect of the invention, therefore, the arrangement is such that the inclination and position of the diffraction grating relative to the optical system is maintained sufficiently constant to maintain interference.

This aspect of the invention therefore provides apparatus mechanically suitable for measuring rough surfaces including rising edges, but in which the optical path length of the diffracted beams is maintained constant and in which the diffraction pattern depends to a much lower degree on the wavelength of the illuminating light and on its coherence length, so that relatively cheap and low power light sources such as semiconductor lasers can be employed.

In one particularly preferred construction, the grating is provided along a curved surface, the grating being positioned and connected relative to the probe such that the portion of the grating providing diffraction maintains a constant alignment relative to the other optical components of the interferometer. Preferably, the grating is connected to the support arm at the other side of the pivot connection from the probe. This extends the effective length of the support arm on the probe side of the pivot, which can be advantageous in measuring enclosed volumes such as tubes.

The curvature of the grating in this embodiment will, however, cause the diffracted beams to diverge or converge depending upon whether the grating is convex or concave respectively. There are therefore preferably provided means for optically correcting the divergence or convergence introduced by the grating. The means preferably comprise a correcting lens or lenses. Where a divergent light source such as a semiconductor laser is employed, the correcting means preferably correct for the divergence of the light source also. Alternatively, the divergence of the light source may be used to compensate convergence due to the grating.

In the grating interferometer provided in FIG. 8-1 of U.S. Pat. No. 3,726,595, the two diffracted beams are arranged to traverse paths of identical length by providing a pair of parallel planar mirrors directing each beam back to a beam splitter which combines the two reflected beams.

In a further aspect of the invention, an interferometric gauge comprises a prism arranged relative to a diffraction grating such that a pair of sides of the prism receive, on their internal surfaces, a corresponding pair of beams diffracted by the grating of equal and opposite order, and direct them on paths of preferably equal length towards an optical combiner for producing an interference pattern therebetween. Preferably, the optical combiner (for example, beam splitter) also comprises part of the prism; preferably, a beam splitter is provided as a central internal surface thereof. Preferably the shape, position and material comprising the prism are so selected that they reflect by total internal reflection. By providing the optical components as part of a single prism, the number of high accuracy alignment and calibration operations required is greatly reduced, thus reducing the production and maintenance costs of the apparatus.

Preferably, the prism is arranged so that the angle of incidence on that reflective surfaces approaches 45°; this enables use of a simpler combiner.

The two reflective surfaces could be made parallel, to simplify construction.

With reference to the TALYSURF™ interferometer discussed above, it was mentioned that the displacement was measured by counting the number of fringes passing an optical detector position. This method provides an accurate measurement, but is limited by the pitch of the fringes which in turn is related to the pitch of the grating. However, higher accuracy can be obtained by measuring the optical signal phase between fringes at the detector position; this is referred to as interpolating between fringes.

U.S. Pat. No. 4,629,886 describes an optical scale reader used in position control of a VLSI fabrication stage which carries a scale, or diffraction grating. The linear position of the stage and scale is measured by a grating interferometer, and two optical detectors are provided giving signals 90° mutually out of phase. As well as providing fringe counting, that apparatus provides an interpolator which operates by selecting whichever one of the two signals is thought to be a better approximation to linearity (in the sense that a sine signal is, for small values, an approximation to a linear signal), digitizing that signal and using the digitized signal as a measure of the interpolated value.

However, the accuracy of this type of interpolator is limited unless a mathematically involved normalization step is performed on the two out of phase signals. Furthermore, it requires an analog to digital convertor of reasonable accuracy. The analog to digital conversion and any subsequent calculations limit the speed of operation of the interpolator.

Accordingly, in another aspect of the present invention there is provided an interpolator circuit for use with interferometric measuring apparatus or the like, which comprises means for generating a reference signal, means for generating a signal representing the difference between the phase of the reference signal and the signal derived from the interferometer, and means for varying the reference signal so as to reduce the difference. The reference signal thus tracks the signal derived from the interferometer in phase, and the phase of the reference signal is output rather than that of the signal derived from the interferometer.

Preferably, the means for providing the reference signal comprises means for providing a control signal and means for providing, in response to the control signal, a signal of predetermined phase. This arrangement is preferable to an arrangement where the control signal controls the frequency (or rate of change of phase), since it is accurate even when the phase is constant (for example, where the probe is static).

In the field of rotating machine tracking, it is known to use tracking devices which provide a digital estimated phase output, examples being the analog devices 1S74 and 2S81 devices described in the respective data sheets available from Analog Devices, Norwood, Mass., U.S.A. However, these devices are unsuitable for fringe interpolation, and have a poor frequency response at high tracking rates.

It will be appreciated that whilst the above preferred embodiment is primarily intended for interferometric apparatus, it could be employed where a phase-to-digital converter operating down to low frequencies or DC is required.

Preferably, the control signal is a digital signal; thus, the control signal can provide a direct digital output measure of the phase. Preferably, the means for providing the control signal is a simple digital counter, incremented when the phase difference between the reference signal and the signal derived from the interferometer becomes larger than a predetermined level; this provides a rapidly acting digital phase output circuit which is of simple construction.

The control signal is conveniently connected to a digital function generator which may simply be a ROM, generating a corresponding digital reference signal value, which is then converted to an analog signal by a digital to analog converter. In such arrangements, relatively accurate and rapidly responding digital to analog converters are substituted for the analog to digital converters of the prior art.

A particular problem can occur when a sudden vibration or mechanical shock is applied to the probe. At very high probe speeds, the interpolator may be unable to track the signal from the interferometer. However, a fringe counting circuit can generally operate at a considerably higher speed and can thus approximately track even rapid probe motions caused by accidental vibration.

It is preferred to provide that the interpolator is synchronized in phase to the fringe counter, so that each fringe count resynchronizes the interpolated phase, and the interpolator and counter are consistent.

In the TALYSURF™ apparatus referred to above, the probe is maintained in contact with the surface over which it travels by gravity. The probe must therefore be directly downwardly onto a surface to be measured, which limits the application of the device to measuring surfaces in situ from below or from the side.

According to another aspect of the present invention, there is therefore provided a surface or profile measuring apparatus including a probe and means for urging the probe against the object to be measured.

Prior art arrangements are known from U.S. Pat. No. 4,669,300, GB 2085156 and GB 1429973 in which probes are biased.

The means could simply be a tension or compression spring, arranged to urge the probe against the surface in one direction. However, the force exerted by such a spring is proportional to the displacement of the probe. It is therefore preferred that the means should apply a substantially constant urging force to the probe.

Alternatively, the urging force is such as to damp vibration of the probe, for example is related to the probe velocity.

The means may also be arranged to lift the probe off the surface, if desired.

The means may comprise an electromagnet comprising a relatively movable coil and pole piece, the force exerted by which is substantially constant and/or is controllable by the current applied to the coil. In an alternative construction, the probe may be biased to a rest displacement position, for example, by providing a pair of urging means urging the probe in opposed directions.

Other aspects and preferred embodiments of the invention will be apparent from the description and claims hereafter.

BRIEF DESCRIPTION OF THE DRAWINGS

The invention will now be illustrated by way of example only, with reference to the accompanying drawings, in which:

FIGS. 9A–9C illustrate output signals produced by the apparatus of FIGS. 6 and 7;

FIG. 10 shows schematically a diffraction grating for use in the embodiment of FIGS. 5 to 7;

FIG. 11 shows schematically a cross-section through a portion of the grating surface of the diffraction grating shown in FIG. 10;

FIG. 12 shows schematically the production of the grating of FIG. 10;

FIG. 13 shows schematically the grating produced by the method of FIG. 12;

FIG. 20 shows schematically a first alternative embodiment to that of FIGS. 5 to 7;

FIG. 21 shows schematically a second alternative embodiment to that of FIGS. 5 to 7;

FIG. 22 shows schematically a third alternative embodiment to that of FIGS. 5 to 7;

DETAILED DESCRIPTION OF PREFERRED EMBODIMENTS

Figure 1:
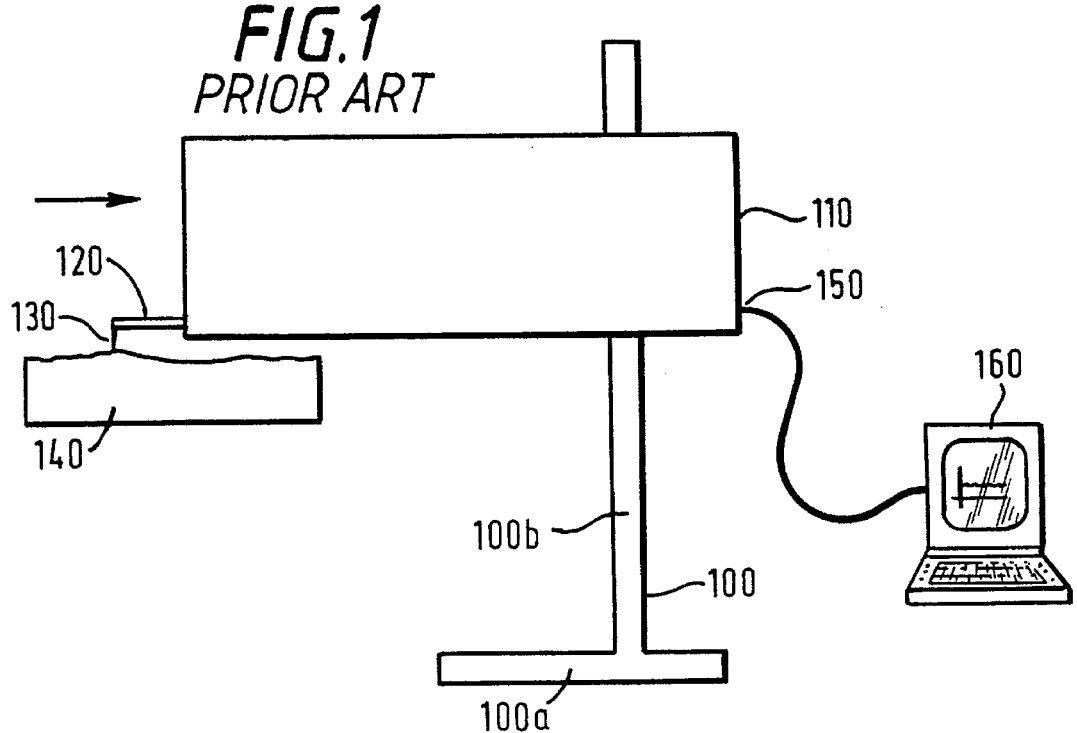
FIG. 1 shows schematically a known form of surface measuring apparatus.

Referring to FIG. 1, a surface measurement system in general may comprise a support stand 100, comprising a base 100a and a column 100b upon which is mountable a traversing unit 110. The traversing unit may be mountable at different vertical positions on the column 100b. Extending from the traversing unit 110 is a support member or arm 120 carrying a downwardly directed stylus or probe 130 comprising a bar with a tapered tip.

For measuring a linear profile across a surface of an object 140, the traversing unit 110 is provided with a precision motor for drawing the support arm 120 and probe 130 linearly inwards over the object 140. The traversing unit 110 is provided with an output 150 for transmitting signals in a suitable format to a display or processing device such as a computer terminal or work station 160.

The signals typically comprise a signal representing the height of the probe 130 (and hence that of the surface of the object 140), and the distance along the object which the motor has moved the probe.

Figure 2:
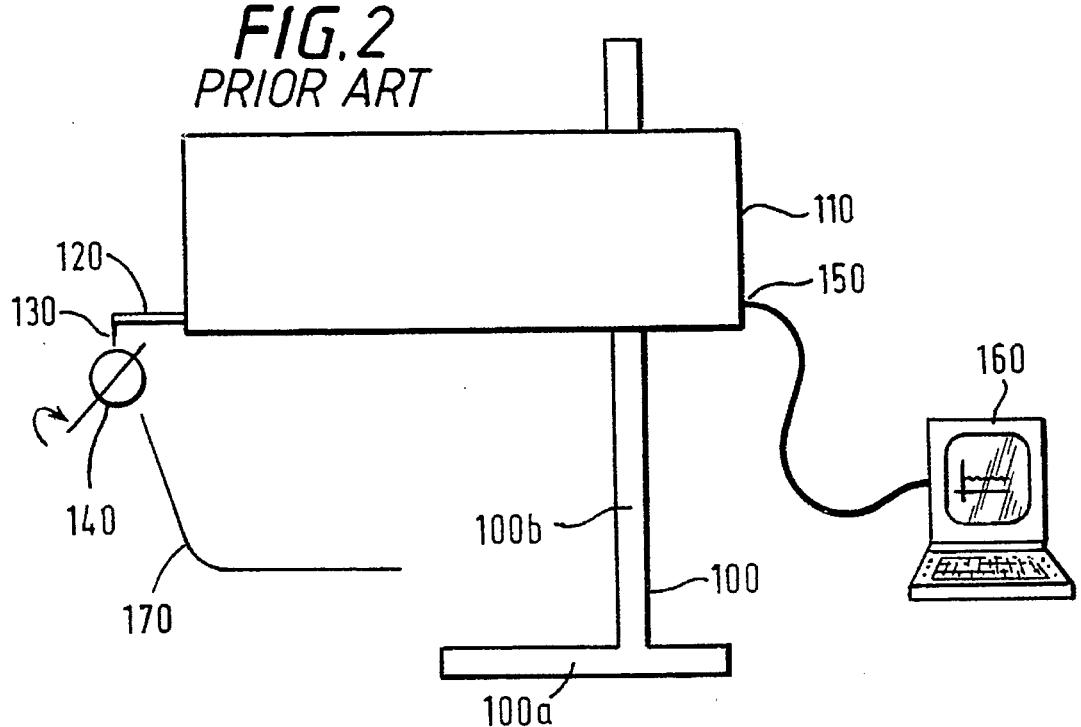
FIG. 2 shows schematically a known form of roundness measuring apparatus.

Referring to FIG. 2, in apparatus for measuring the eccentricity or roundness of, for example, shafts, the traversing unit 110 does not require a linear driving motor; instead, a rotatable motor is provided for rotating the object 140, and an output 170 representing the rotational position of the object is likewise provided.

Figure 3:
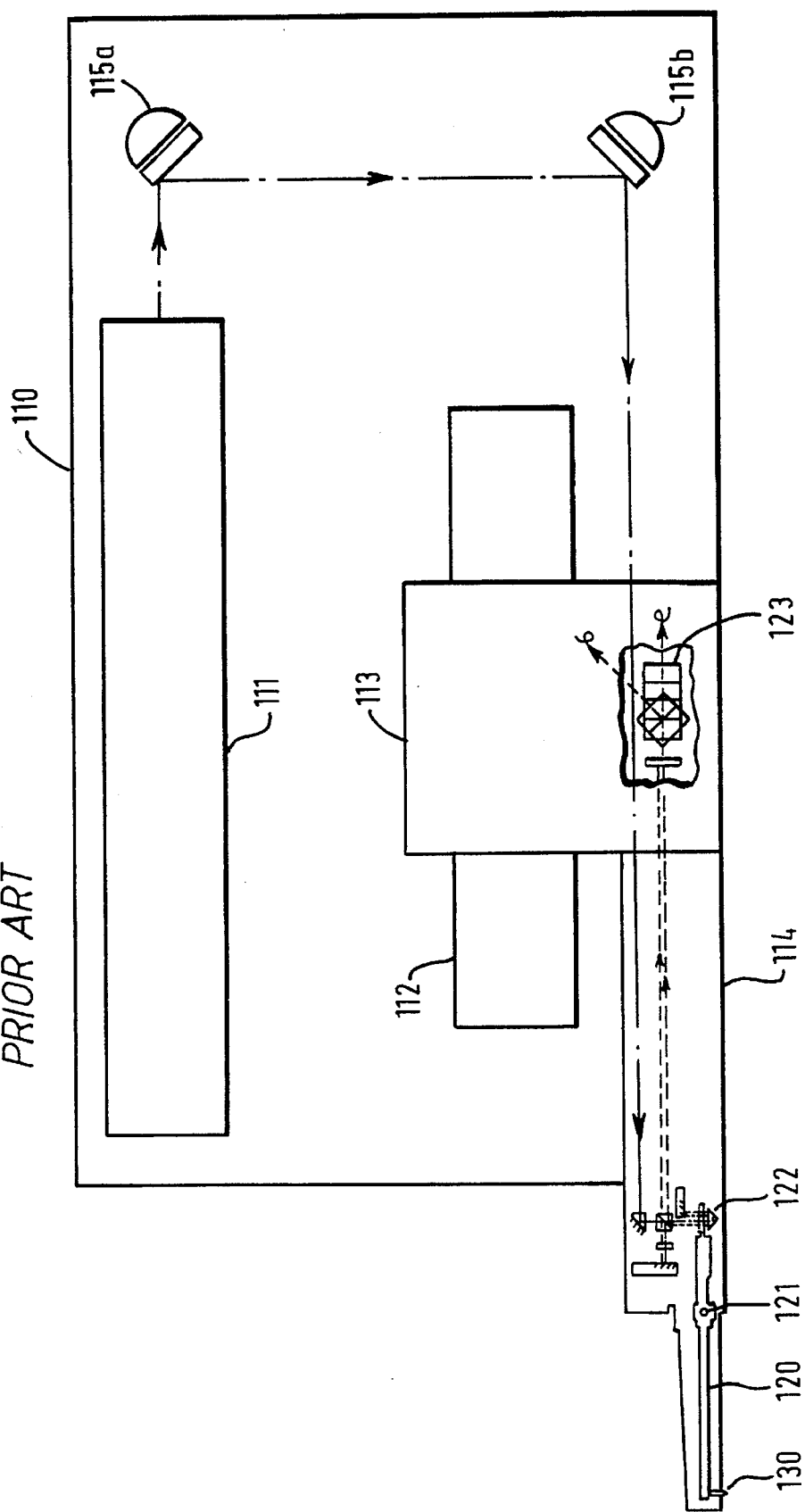
FIG. 3 shows in greater detail a known type of measuring apparatus for use in FIGS. 1 and 2.

Referring to FIG. 3, the traversing unit 110 in a known interferometric gauge comprises a helium neon laser 111, a shaft 112 provided parallel to the surface to be measured (in other words, generally horizontal), a carriage unit 113 containing a motor engaging the shaft 112 to move the carriage 113 along the shaft 112 (through a reduction gearbox), a carriage position sensor (not shown) for generating a signal representing the position of the carriage 113 along the shaft 112, and a pickup tube 114 forming a relatively light tight enclosure solid with the carriage 113.

Light guides 115a, 115b direct the beam from the laser 111 down the pickup tube 114. The stylus 130 is mounted at the end of the support arm 120 which is pivotally mounted to the pick up tube 114 by a pivot axle 121. The support arm 120 projects beyond the pivot 121, and at the other end of the arm 120 is mounted a reflector 122 comprising a corner reflector. The corner reflector defines the end of one arm of a Michelson interferometer as illustrated, which requires no further description, and a beam splitter and quarter wave plate assembly 123 is arranged to provide a pair of output signals spaced apart in phase by 90°. The signals are supplied to respective photoelectric detectors which provide respective sine and cosine electrical signals for fringe counting. The bulk of the laser and of the optical system which are required with this kind of interferometer will be apparent from FIG. 3.

As the probe 130 is drawn over the surface of the object 140 by the carriage 113 traversing the shaft 112, the probe 130 is urged by gravity onto the surface to rise and fall with the surface; the reflector 122 respectively falls and rises correspondingly, varying the length of a path of the Michelson interferometer and causing fringes to move past the beam splitter assembly 123 and vary the signals at the detectors. The detector signals are processed by the display or output device 160 to provide a representation, or data relating to, the profile being measured.

Figure 4:
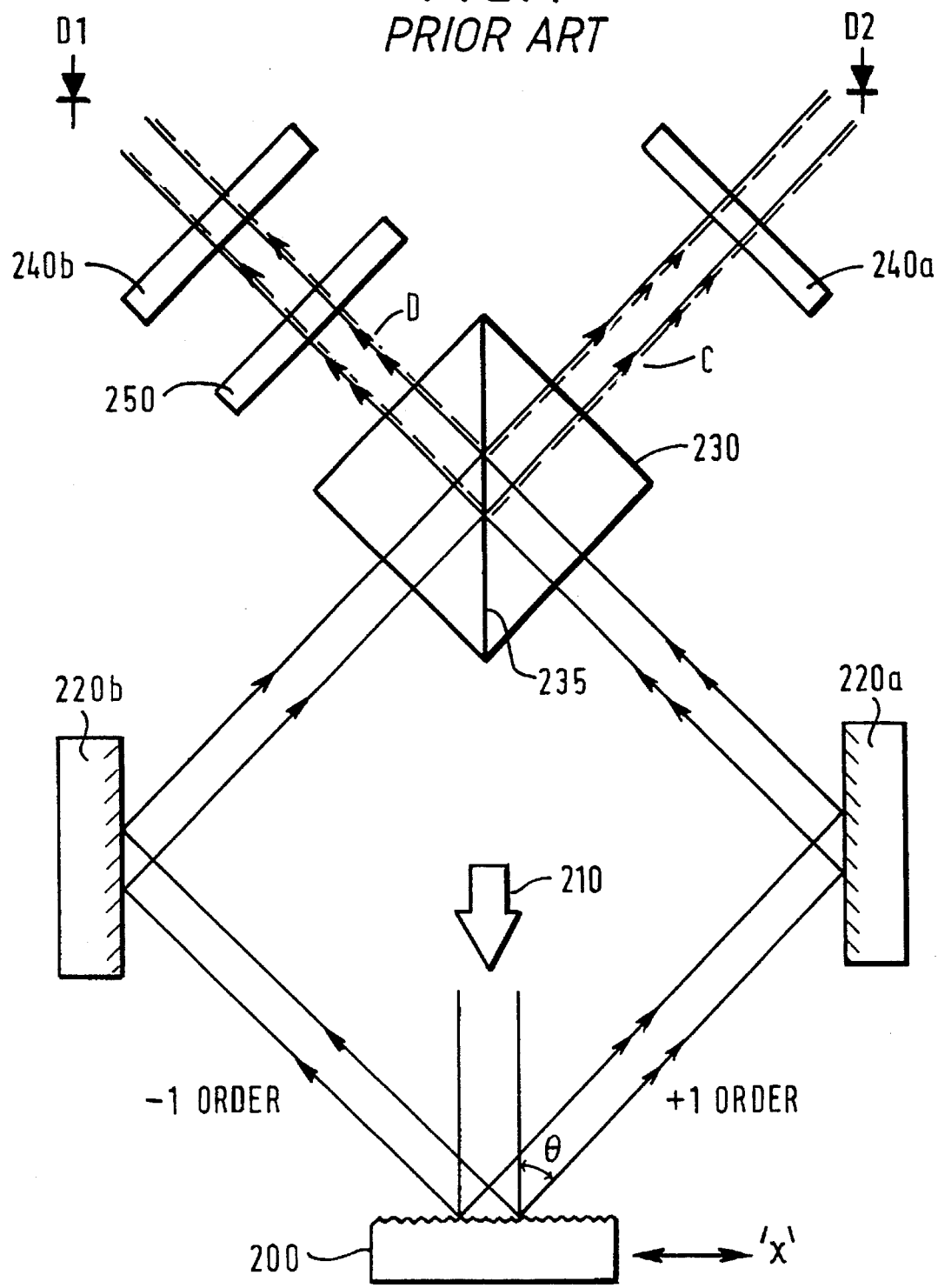
FIG. 4 shows schematically the elements of a grating interferometer.

Referring to FIG. 4, a brief description of the application of the known type of grating interferometer to positional measurement will now be given.

A diffraction grating 200 comprises, in the prior art, a plate with a plurality of parallel straight ridges on the surface spaced apart by a pitch d defining a diffraction grating. The grating 200 is movable normal to the line of the ridges in the plane of the grating. The grating 200 is illuminated by a light source 210. If the grating material is transparent the illumination may be from the other side of the plate to that upon which the grating lies. The light from the light source 210 is preferably from a laser, although since a long coherence length is not necessary it is possible that some other collimated source having a well defined frequency could be used. Where the spacing between lines of the grating 200 and the wavelength of the light from the light source 210 are on the same order, diffraction will occur; for example, with a light wavelength of 670 nm (producible by a laser diode) and a grating spacing or pitch of $\frac{1}{1200}$ mm=833 nm, a pair of strong +1 and −1 first order beams are produced at angles ±θ to the normal to the grating 200; θ in this example is approximately 54°.

A pair of mirrors 220a, 220b are positioned in the path of the two beams, so as to bring the beams together at point in space at which a combiner 230 is positioned. The mirrors 220a,220b need not be parallel; in an alternative construction, each may be inclined to its respective beam path by an angle equal but in the opposite direction to the other. Further, the mirrors 220a,220b need not be located equidistantly from the grating 200. It is preferred that the paths travelled by each beam via the mirrors to the combiner 230 should be equal in length so that a short coherence length light source can be used.

The combiner 230 is conveniently a dichroic beam splitter prism, but could alternatively be a half silvered mirror. At a reflective surface 235 within the combiner 230, at least a portion of one of the beams is reflected to lie coincident with the path of the second which is transmitted through the layer 235. The output beam C from the combiner thus comprises both the first order diffracted beams from the grating 200. Where a dichroic combiner 230 is employed, however, the transmitted and reflected portions of the combined beam C will have different polarizations. An analyzer 240a comprising a polarizing sheet is therefore provided in the path of the combined beam C with its axis of polarization lying between the polarizations of the reflected and combined portions of the beam so as to pass an equal proportion of each; after passing through the analyzer 240a, the combined beam thus comprises a beam whose amplitude is the sum of the amplitudes of the two diffracted beams from the grating 200. A photoelectric detector or some other optical pickup or detector is therefore positioned within the beam after the analyzer 240a.

Where the combiner 230 is a dichroic prism, a second combined beam D may also be produced which likewise comprises both diffracted orders but in orthogonal polarizations, and a second analyzer 240b comprising a polarizer having a polarization between those of the two beams is correspondingly provided to give a second output responsive to the sum of the amplitudes of the two diffracted beams. This second output beam may be utilized to provide a second signal which lags that output by the analyzer 240a by a fixed phase lag, for example 90°, by providing a transmission plate 250 having a thickness corresponding to an optical path length a corresponding fraction of the wavelength of the light source 210; for example, a quarter wave plate.

At a predetermined lateral position, the two first order beams produced by the diffraction grating 200 will be in phase, and the beam at the output of the combiner 230 will therefore be a sine wave having twice the amplitude of either of the diffracted beams. Neglecting the finite length of the grating 200, if the grating 200 is shifted laterally by a distance equal to one or an integer number of grating periods, the grating 200 will appear to be optically identical; the amplitudes of the combined beam after the analyzer 240a are therefore equal and maximum when the grating is at positions spaced apart by one grating period.

If, on the other hand, the grating 200 is translated laterally by a distance which is not an integer number of grating periods, the phase of the two diffracted beams is shifted by equal and opposite amounts. In other words, the phase of one order beam is shifted forward, and that of the other is shifted backwards. The effect of the phase shift is that the two components of the combined beam C are out of phase by twice the phase shift, and this reduces the amplitude of the combined beam output by the analyzer 240a. When one beam has shifted 90° forward and the other 90° backward, the two components of the combined beam are 180° out of phase, and the amplitude of the combined beam after the analyzer 240a is close to 0 (or, at any rate, a minimum). When the grating is translated by half its pitch, the phase of each diffracted beam is shifted by 180° so that the phase difference between the two in the combined output of the analyzer 240a is 360°—in other words, they are in phase once more.

To sum up, a detector positioned to measure the amplitude of the beam after the analyzer 240a as the diffraction grating 200 is laterally translated would measure amplitude maxima at grating positions spaced apart half a grating period, separated by intervening dark fringes or amplitude minima; the beam amplitude in general is a sinusoidal, positive going, function of lateral position of the grating 200.

It will thus be apparent that the grating interferometer illustrated above measures the phase change in a beam of light diffracted by a grating as it is laterally translated; it will therefore be apparent that instead of using the first order diffracted beams, a pair of higher order diffracted beams could be used. Equally, it would be possible to derive the phase shift of the diffracted beam otherwise than by using a pair of diffracted beams of equal but opposite order; for example, the incident beam from the light source 210 might be employed as a reference phase source.

However, the advantage of using a symmetrical arrangement of the type illustration in FIG. 4 is that the optical path lengths traversed by the two beams can be made virtually equal. To produce interference, the optical path difference between the path lengths traversed by the two beams must be kept below the coherence length of the light source. Thus, whilst it would be possible to use different optical path lengths provided a laser source with a high coherence length (such as a helium neon laser) were provided, the use of symmetrical, approximately equal optical path lengths enables the use of low coherence light sources such as semiconductor laser diodes, which may have coherence lengths only a fraction of a millimeter. Where the two path lengths are sufficiently similar, a substantially incoherent light source could be employed instead of a laser.

For example, a red LED (Light Emitting Diode), operating at a wavelength of, for example, 650 nm, could be employed, the beam therefrom being filtered by a narrow band optical filter having a bandwidth of around 1 nm; this would provide a coherence length of approximately 400 um which is sufficient when the above embodiment is employed, as the path lengths are substantially equal to at least this accuracy. To collimate the beam from the LED, a pinhole is likewise provided in this embodiment. It is preferred to employ a monochromatic source such as an LED, rather than a completely incoherent or broadband source, since this avoids the appearance of colored fringes in the interference pattern.

Where a pair of mutually phase shifted output beams C,D are produced, as shown in FIG. 4, the amplitudes of the two beams may be processed so as to derive an indication of the direction of translation of the grating 200.

The profile of the ridges on the grating 200 affects the relative strengths of the different order diffracted beams; an approximately sinusoidal profile is preferred, where, as here, strong first order diffracted beams are required. It is possible, instead of providing the diffraction grating as a plurality of ridges, to provide instead an amplitude grating comprising alternating reflective and absorbant stripes.

The effect of varying the wavelength of the light source 210 is to alter the angle of diffraction θ of the diffracted beams as $\sin \theta = m \lambda/d$, where $\lambda$ is the wavelength. Where some variation in wavelength is encountered, the mirrors 220a, 220b, combiner 230, and analyzers 240a 240b etc. should be made sufficiently wide to accept the expected range of diffraction angles.

Finally, it will be noted that the effect of moving the grating 200 perpendicular to its plane would be to shift the diffracted beams, together, in a corresponding direction; this could therefore eventually shift the beam paths so as not to include one or more of the optical components of the interferometer. The effect, however, of a rotation of the angle of the grating 200 is considerably more marked, since the angles of the diffracted beams will be shifted in opposite directions. The beams will therefore swiftly be brought out of coincidence at the combiner 230, leading to failure of operation of the device. The operation of the interferometer illustrated in FIG. 4 is thus considerably more sensitive to angular misalignment between the grating 200 and the other components of the interferometer than it is to either longitudinal translation of the grating 200 or shift in the wave length of the light source 210.

Figure 5:
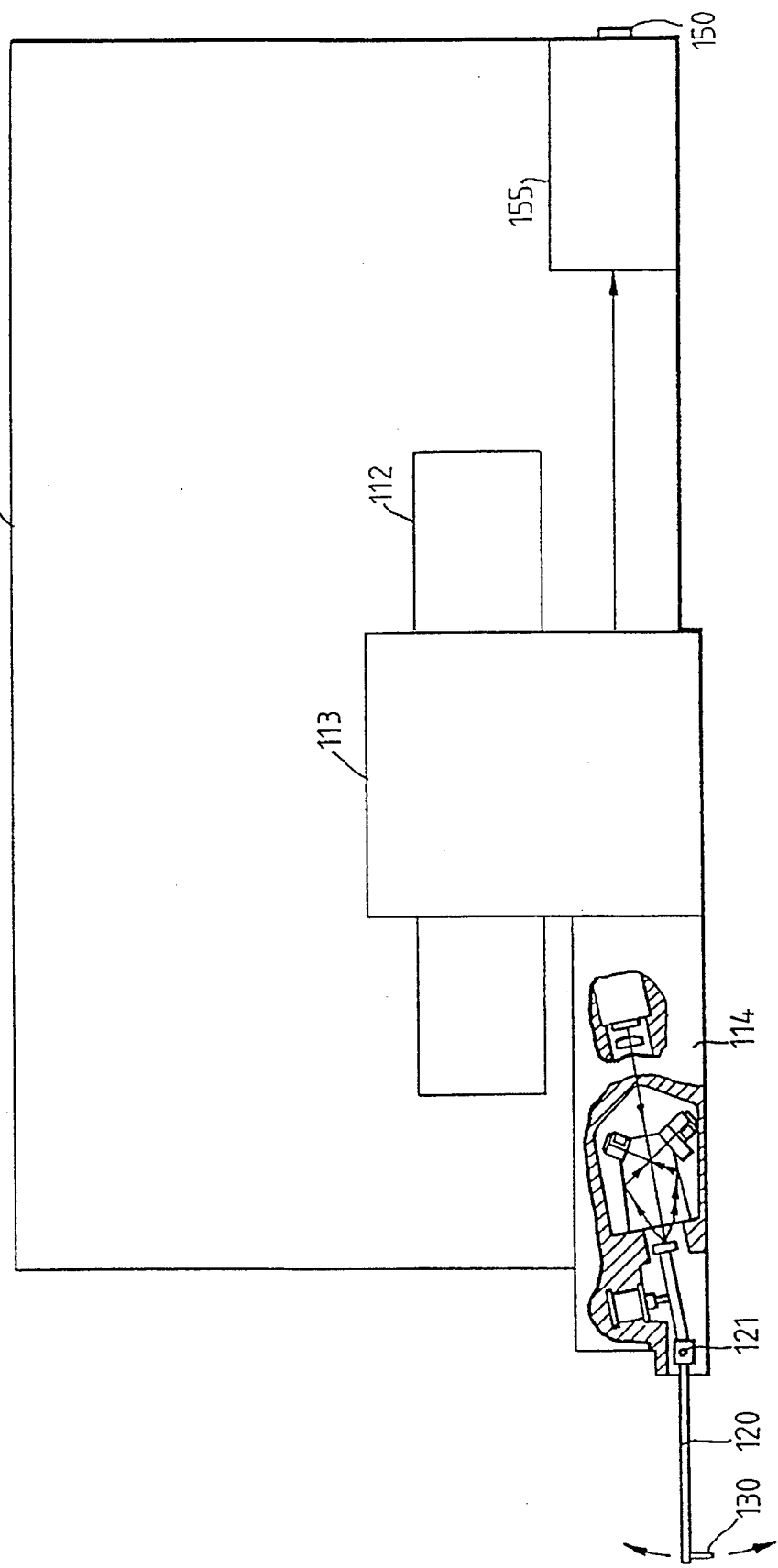
FIG. 5 shows schematically the arrangement of a preferred embodiment of the invention for use in the apparatus of FIGS. 1 or 2.

Referring to FIG. 5, which corresponds generally to FIG. 3 and in which like parts are correspondingly labelled, a traversing unit 110 comprises a lateral shaft 112 and a carriage 113 movable along the shaft 112 by a motor (for example, a DC motor driven through a reduction gear box). A probe or stylus 130 is provided near one end of a support member or arm 120, mounted by a pivot bearing 121 to a pickup body assembly 114 solid with the carriage 113. Also provided are a signal processing circuit 155 receiving electrical signals from the body 114 as discussed below and an output port 150 providing output signals from the signal processing circuit 155. Further provided, but omitted for clarity, are power supply and control lines for the carriage motor, and a position output circuit providing a signal representing the carriage position on the shaft 112, together with power supply lines to the body 114 and signal processor circuit 155.

Figure 6:
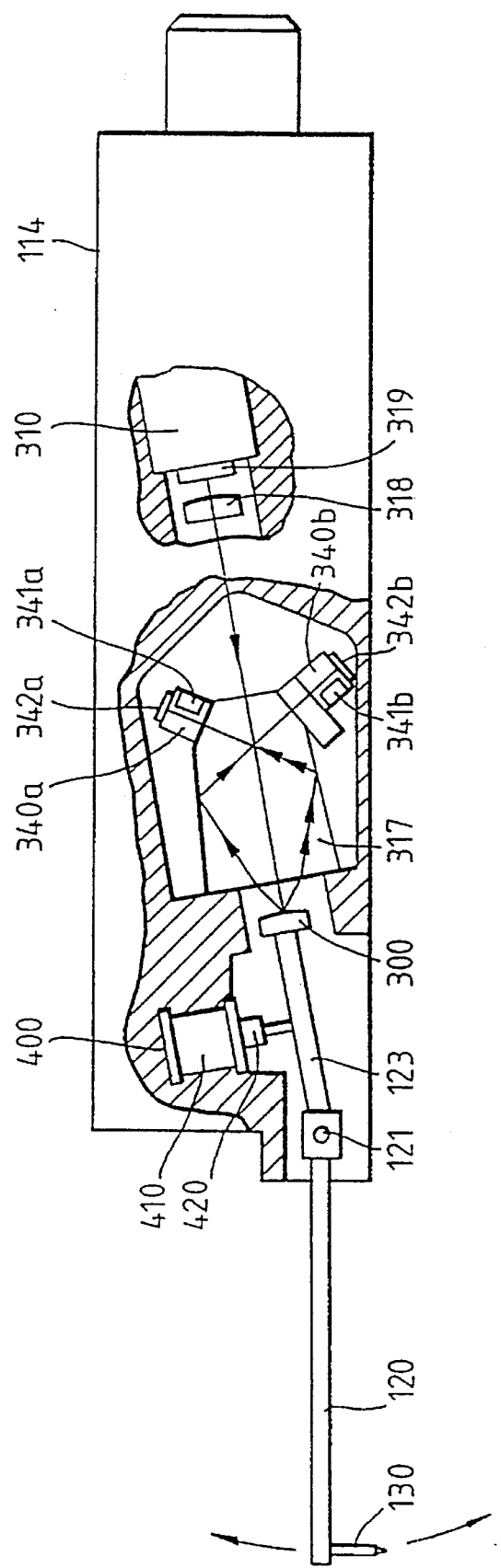
FIG. 6 shows schematically a portion of FIG. 5 in greater detail.

Referring to FIG. 6, within the body 114 are provided a light source 310 comprising a laser diode of wavelength approximately 670 nm, and a collimating lens in the beam. The support arm 120 extends beyond the pivot bearing 121 in a portion 123 upon the end of which is mounted an optical component having a curved face, the curvature of which conforms to that of a circular arc centered at the pivot bearing 121. On the curved face is provided a diffraction grating comprising a plurality of parallel diffracting features inclined parallel to the pivot 121. Light from the light source 310 is directed straight through a prism 317, normally onto the surface of the diffracting grating 300. Two diffracted first order beams produced by the diffraction grating 300 enter the prism 317 discussed in greater detail below, which provides two output beams each of which passes through a respective output analyzer comprising a beam splitter prism. One beam splitter prism 340b is preceded by a quarter wave length plate 350. Provided on two faces of each analyzer beam splitter 340a, 340b are respective detectors 341a, 342a, 341b, 342b (not shown in FIG. 6). Each detector comprises a photodiode responsive to the amplitude of light thereon to generate a corresponding electrical output signal.

Also provided, in the path between the light source 310 and the diffraction grating 300, is a lens 318, acting to converge the collimated beam from the light source 310 so as to reduce the divergence produced by the curvature of the diffraction grating 300 as discussed in greater detail below.

Further provided, connected to the support arm 123, is a biasing force arrangement 400 comprising a linear electromagnetic coil 410 surrounding a linear magnetic armature or pole piece 420 connected to the support arm 123 so as to exert a pulling or pushing force thereon in accordance with the current supplied to the coil 410.

The pitch of the grating and its distance from the pivot 121 are to some extent related, since the ratio of movement of the gauge to movement of the probe is dictated by the ratio of the arm portions 120 and 123 or, in other words, the radial displacements of the probe 130 and grating surface 301. The pitch of the grating is to some extent dictated by the wavelength of the available light source, and by the limitations of the method used to produce the grating.

For a given grating size, the distance translated by the grating (and hence the number of fringes generated by that translation) relative to that translated by the probe is in the ratio of their respective distances from the pivot 121. For this reason a relatively long arm portion 123 would be desirable. On the other hand, if the arm 123 is too long, inertia about the pivot 121 damps the response time of the gauge. In the illustrated embodiment, the portion 123 (from pivot to grating surface 301) is chosen to be about half the length of the support arm 120. For surface measurement the length of the support arm 120 is typically 60 mm.

Figure 7:
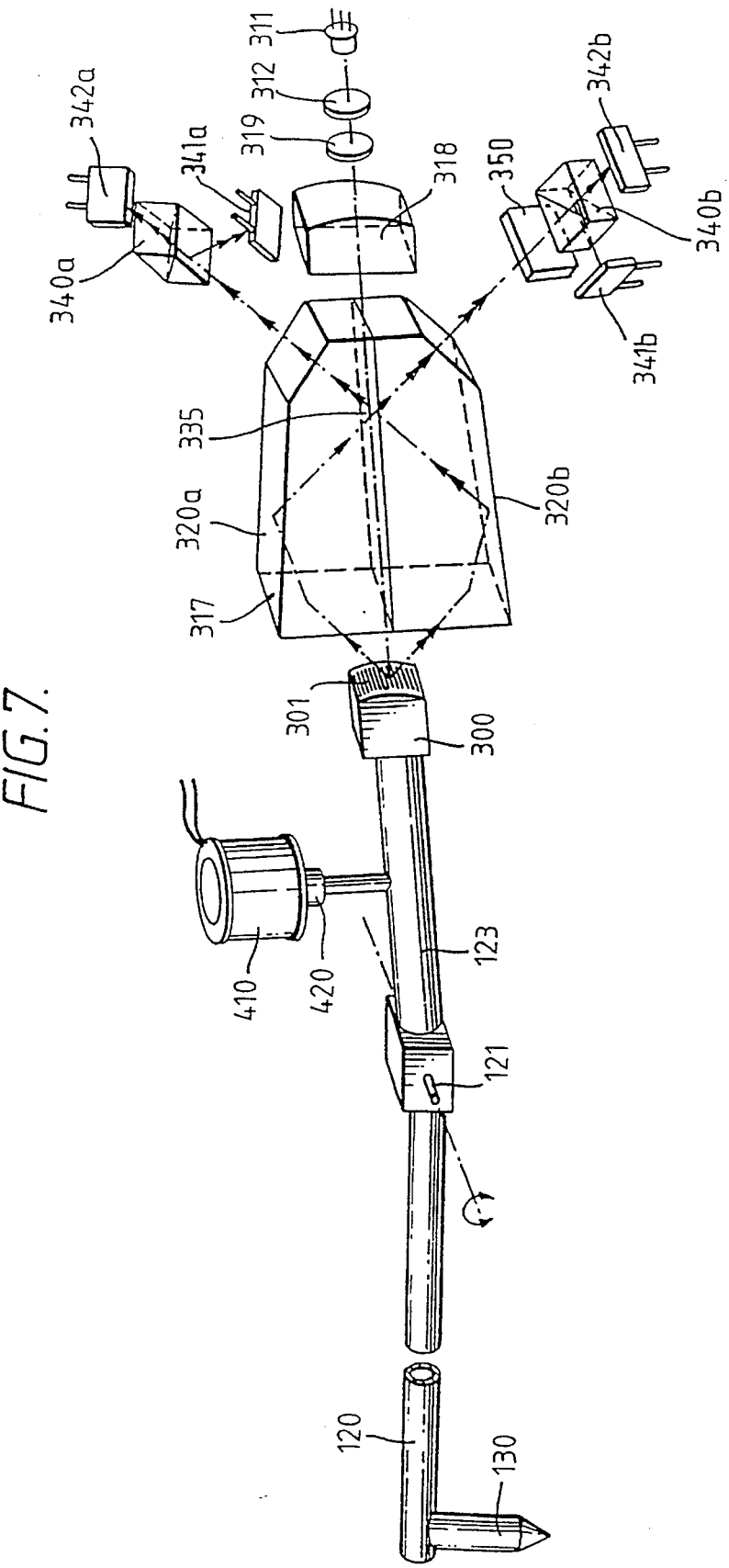
FIG. 7 is an exploded view of a portion of FIG. 6.
Figure 8A:
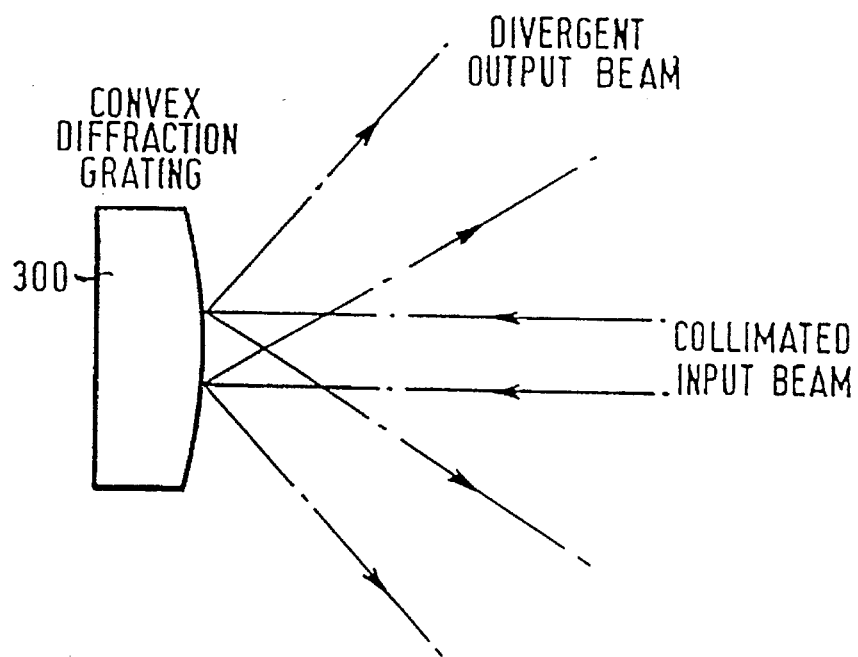
FIGS. 8A and 8B illustrate the effects of a curved diffraction grating, and a lens compensating therefor.

Referring to FIG. 7, the operation of the apparatus shown in FIG. 6 will now be discussed in greater detail. The laser diode 311 is energized to provide an output laser beam, which is collimated by a collimator lens 312. Typically, the beam produced by the laser diode and collimator lens is about 2 mm wide. The collimated beam passes through a halfwave thickness transparent plate 319 provided to enable adjustment of the polarization direction of the beam. The light beam is directed through a cylindrical shaped lens 318 which converges the collimated beam. Referring to FIG. 8a in the absence of the cylindrical lens 318, the collimated beam would, when diffracted by the convex curved diffraction grating 300, produce diverging diffracted output beams.

Figure 8B:
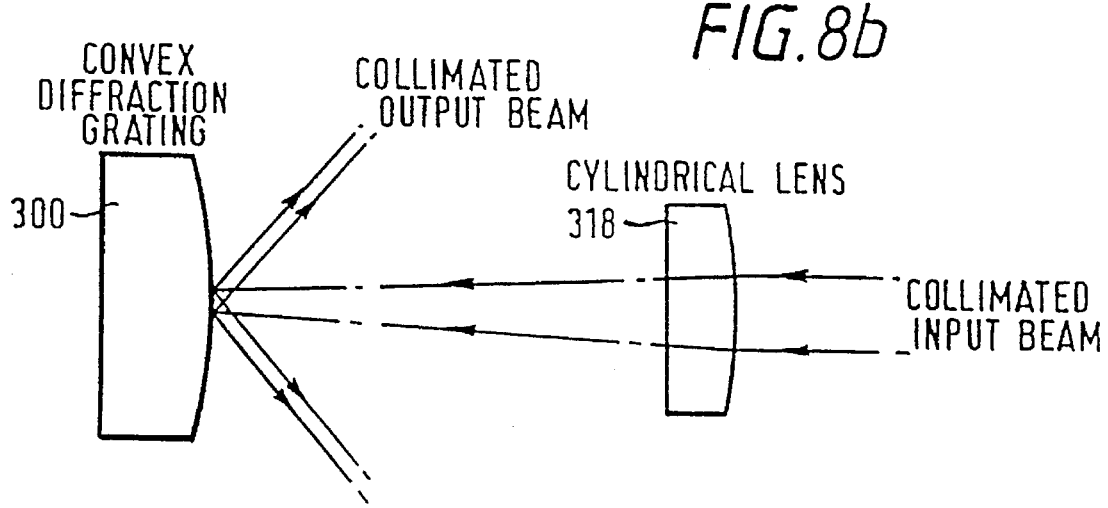

By providing the cylindrical lens 318, a corresponding convergence in the input beam is provided so that the diffracted beams from the diffraction grating are collimated as shown in FIG. 8B. The lens 318 may also correct any divergence or convergence in the beam from the light source 310.

The beam is then received normally to the end face of the prism 317 and passes along the central symmetry axis of the prism 317 and impinges normal to the surface of the diffraction grating 300.

Because the surface 301 carrying the diffraction grating is disposed upon a cylindrical surface centered about the pivot 121, the portion of the surface 301 upon which the light beam impinges (or, more accurately, a tangent to the surface) is always normal to the light beam regardless of the orientation of the pivot arm 123 about the pivot 121. By way of contrast, if the grating were provided on a flat planar surface the angle presented by the grating to the light beam would shift, as would the distance from the light source 310 and prism 317, with rotation about the pivot 121.

A pair of first order diffracted beams are produced at an angle θ dependent upon the illuminating wave length λ and the pitch or spacing between lines of the grating; for a pitch of 1200 lines/mm and illuminating wavelength of 670 nm, the diffraction angle θ relative to a normal axis to the grating is approximately 54°. The two diffracted beams enter the rear planar surface of the prism 317 and are refracted thereby by an amount dependent upon the refractive index thereof. The refracted beams each impinge upon a respective side face 320a,320b of the prism and, provided the angle of incidence thereon is greater than the critical angle for total internal reflection angle for the material of which the prism is made, are reflected back towards the center of the prism. The inclinations of the faces 320,320b to the center of the prism are equal and opposite so that the two beams meet the center of the prism at the same point.

Disposed along the longitudinal center plane of the prism is a dichroic layer 335 arranged, as is conventional, to respond to an incident light beam by transmitting a portion thereof in a first polarization plane and reflecting a portion thereof in a second polarization plane (the S and P polarizations).

The planar layer 335 therefore reflects a portion of each diffracted beam coincidentally with a transmitted portion of the other, to produce combined output beams. However, of each combined beam, the reflected and transmitted portions exhibit different polarization and their amplitudes are therefore not additive. Each beam leaves the prism 317 through an end face normally inclined to the beam path. One beam enters an analyzer 340a; the second enters a quarter wave plate 350 prior to entering an analyzer 340b.

Each analyzer 340 comprises a further beam splitting prism, each comprising a cubic prism cut along a diagonal plane, including a dichroic layer structure between the two halves thereof. The effect of the dichroic layer in the 45° diagonal plane of each analyzer is to act as a beam splitter, transmitting one portion of an incident beam and reflecting a second. The rotational orientation of the diagonal plane of each beam splitter 340a,340b is so selected that each of the reflected and transmitted beams produced thereby includes an equal proportion of the S and P polarizations of the output beam from the prism 317, and hence an equal proportion of each of the diffracted orders from the diffraction grating 300. The beam splitter prisms, 340a,340b, are therefore rotationally inclined at 45° to the planes of the prism 317 which they face. Conveniently, the beam splitter 340a is adhesively cemented to one end face of the prism 317, and the quarter wave plate 350 and beam splitter 340b are cemented in that order to the other.

A photodetector (for example, a photodiode) 341a,341b is provided to receive the reflected beam from each respective analyzer 340a,340b and a further detector 342a,342b is provided to receive the transmitted output from a respective beam splitter 340a,340b. The reflected output in each case is phase shifted by 180° due to the reflection.

Referring to FIG. 9, a graph showing the output of each detector for rotational displacement θ of the grating 300 corresponding to half the displacement between adjacent grating lines is shown. Although ideally the output of each detector, against grating displacement, is sinusoidal ranging between 0 and a maximum value, it is in practice found to vary between a maximum value and a non-zero minimum value (due to ambient light and the finite beam and grating size amongst other things). The minimum and maximum intensities are, or can be arranged to be, equal in the reflected and transmitted beams but, as noted above, the sinusoidal component is 180° out of phase.

Rather than using one of the reflected or transmitted output signals directly, in this embodiment subsequent signal processing to count fringes is simplified by providing such a pair of detectors 342a, 341a or 342b,341b and subtracting their electrical output signals one from another to provide the subtracted signals illustrated in FIG. 9C. The result (not shown to scale) is a sinusoidally varying signal of twice the amplitude of the sinusoidal components of the individual detector outputs, centered about 0 since the DC components of the two signals are cancelled in the subtraction.

Referring to FIG. 10, in the illustrated embodiment the grating 300 comprises a glass block the lower surface of which is approximately rectangular, measuring for example 6 mm×4 mm, and the upper surface of which is accurately ground or cast to a cylindrical profile of a radius corresponding to the height of the block (typically 5 mm) plus the length of the arm 123 to which it is mounted. This may, for example, be 30 mm. Referring to FIG. 11, on its curved surface the block carries a diffraction grating comprising a pattern of ridges spaced apart by a pitch typically 0.8333 μm (¹⁄₁₂₀₀ mm). A sinusoidal profile is preferred to provide strong first order diffracted beams. The ridged surface is coated with a reflective layer such as aluminium to provide a reflection grating.

Referring to FIG. 12, one way of providing such a grating is to cover the curved surface of the glass blank with a layer of a photohardening compound, and direct thereon a pair of mutually inclined laser beams having a wave length on the order of the grating required. This hologram technique produces a well defined interference pattern with a sinusoidal intensity distribution, and this produces a corresponding fringe pattern of exposure in the photosensitive layer. When exposure is complete, the surface is etched or washed to remove either the exposed or the unexposed regions of the photosensitive layer, leaving a pattern of ridges. The patterned surface, including the ridges, may then be coated with aluminium by any suitable process. Alternatively, the pattern of ridges could be used as a mask through which to perform a selective etch.

Referring to FIG. 13, when this technique is employed, the pitch of the curved grating produced will only be absolutely correct at the apex of the substrate, and will increase slightly towards the edges of the component; in the example given, if the pitch at the center is 0.8333 μm the pitch at the edges is 0.8372 μm (about 0.5% higher). Since the beam width is on the order of 2 mm, the variations in grating spacing giving rise to each diffracted beam are a fraction of 1% which, nonetheless, does somewhat degrade the performance of the grating.

The increase in the grating pitch towards the edges of the grating also shifts the angle of diffraction slightly. However, since the angle is shifted for both diffracted beams they continue to have an equal path length and to coincide within the prism, and thus this effect is insignificant provided that the optical components and the detectors all have a finite extent. Finally, the increase in the pitch of the grating towards its edges makes the relationship between the number of fringes detected by the detectors and the angles through which the grating rotates slightly non-linear towards its edges. However, the relationship between the vertical motion of the probe and the rotation of the grating is non-linear in the opposite sense, so this effect is somewhat alleviated.

Any remaining non-linearity can be well measured and characterized for given gauge dimensions or derived by performing a calibration of the gauge. It is simple to provide a correction circuit to correct the output signals derived from the interferometer, as discussed in more detail below, or correction can be performed by a computer or other device 160 to which the gauge is connected.

Nonetheless, it is anticipated that the performance of the apparatus may be enhanced by providing a curved grating 300 in which the pitch variation is reduced below this level (and preferably eliminated).

Figure 14:
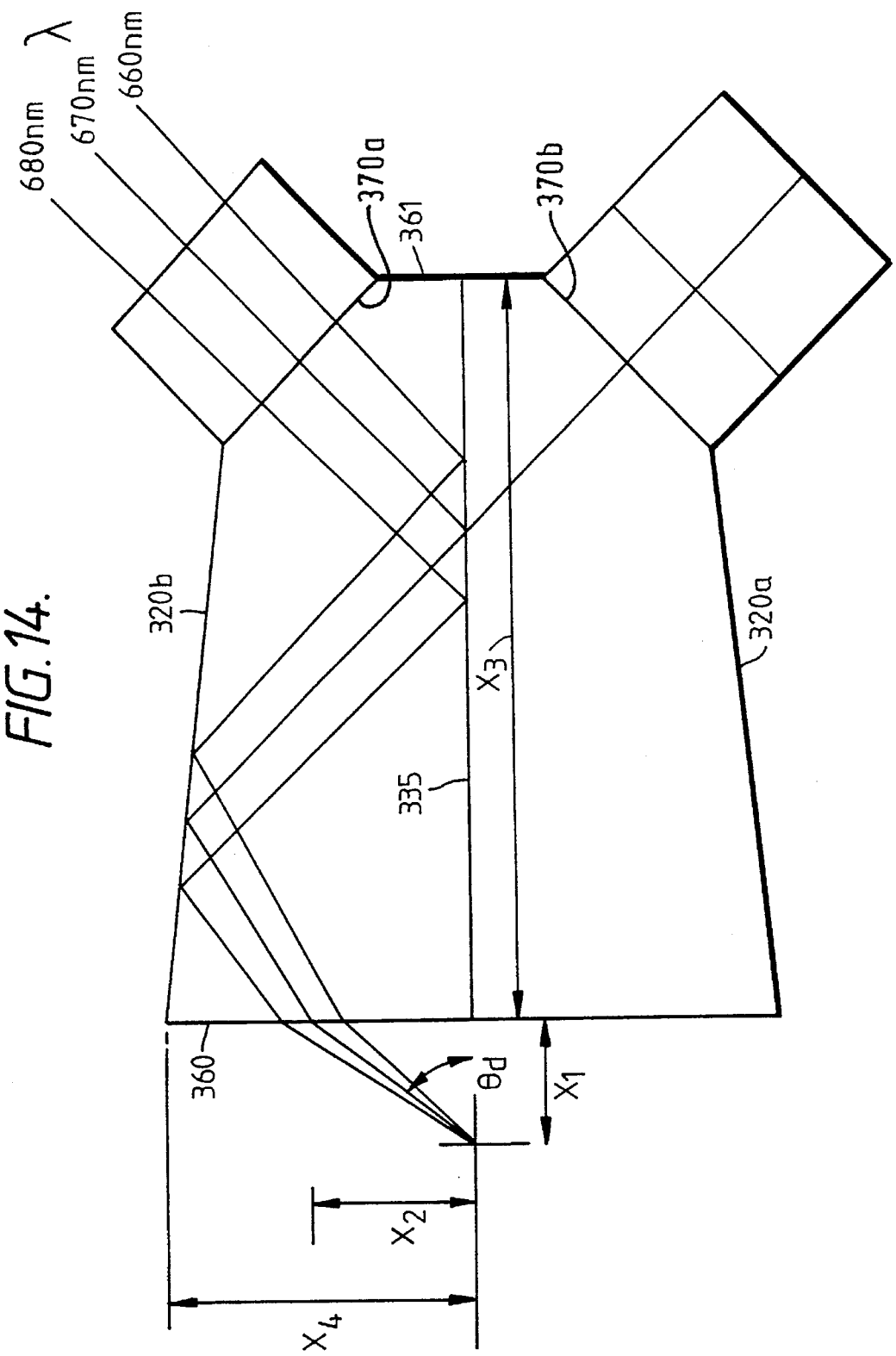
FIG. 14 is an accurate scaled elevational view of the prism employed in the apparatus of FIGS. 5 to 7.
Figure 15:
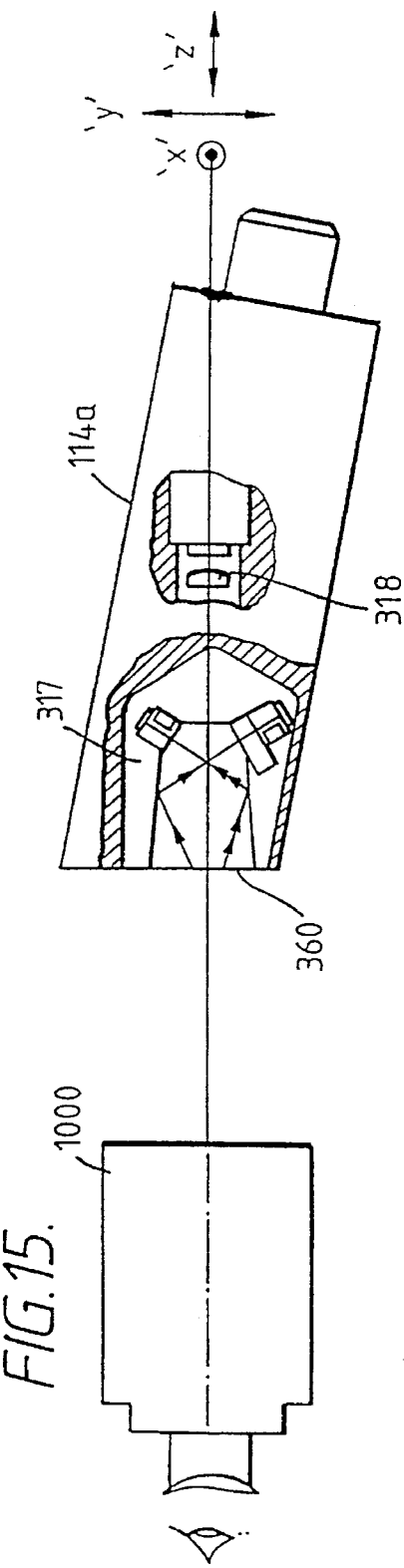
FIG. 15 illustrates schematically a first stage in aligning the apparatus of FIG. 6.
Figure 16:
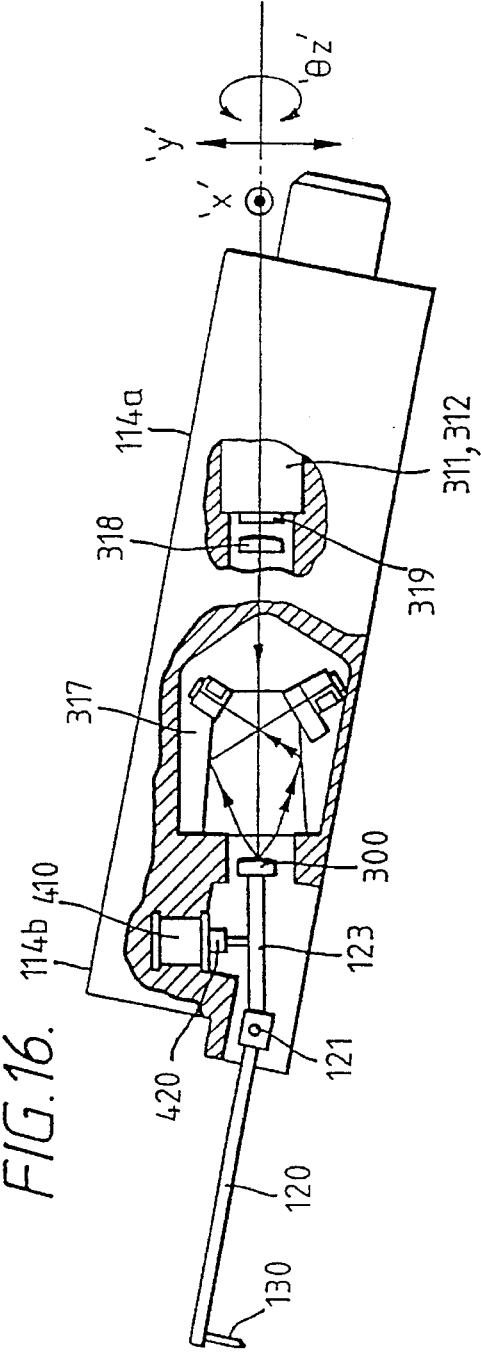
FIG. 16 illustrates a second stage in aligning the apparatus of FIG. 6.

Referring to FIG. 14, the structure of the prism 317 will be discussed in greater detail.

The prism is symmetrical about the dichroic layer 335 and comprises a pair of inclined sides 320a,320b, and base and top surfaces 360, 361 normal to the dichroic layer. In depth, into the paper in FIG. 14, the prism 317 is preferably equal to or slightly wider than the grating 300; i.e at least 4 mm deep. A pair of exit planes 370a, 370b are provided arranged at an angle to the central plane 335 so as to be normal to a beam totally internally reflected from the opposed one of the side faces 320a or 320b, through a point in the center plane 335.

Conveniently, the prism is manufactured as two components respectively above and below the center plane 335 in FIG. 14 and assembled together at the center plane 335.

The material of the prism is preferably glass, for dimensional stability and ease of manufacture, for example with a refractive index 1.51. In this case, for co-operation with a grating of period d=0.8333 μm, so that the diffraction angle $\theta_d = m\lambda/d$ where m=±1, and λ=660 nm–680 nm, dimensions of the prism shown in FIG. 14 may be as follows:

| λ | 1<br>660 nm | 2<br>680 nm |
|---|---|---|
| $\theta_d$ (°) | 52.37 | 54.69 |
| $x_1$ (mm) | 3.75 | 3.75 |
| $x_2$ (mm) | 4.86 | 5.29 |
| $x_3$ (mm) | 22.50 | 22.50 |
| $x_4$ (mm) | 9.55 | 9.55 |

(d = 0.8333μ)

The multilayer dichroic coating at the plane 335 is calculated and deposited in a known manner so as to provide a surface at which a beam incident thereon is split into reflected and transmitted components having different polarizations of generally similar amplitudes.

The sides 320a,320b are inclined inwardly at equal angles such that the angle of incidence of the diffracted beams after reflection from the sides 320a,320b upon the beam splitting central plane 335 is close to 45°. With this arrangement, the coating within the beam splitting layer 335 is relatively simple.

By careful selection of the refractive index of the material of the prism 317, and the distance between the prism 317 and the grating surface 301, and the angles of the diffracted beams (which in turn are dictated by the wave length of the incident light source and the pitch of the diffraction grating 300), it would also be possible to provide a prism 317 with parallel sides 320a,320b and an angle of incidence of 45° at the central layer 335.

One suitable coating at the central layer 335, for an angle of incidence of 45°, is selected so as to transmit a beam in the P polarization and reflect a beam in the S polarization of approximately equal magnitude, and to have very low transmission in the S plane and reflection in the P plane. This is achieved by providing alternating interleaved layers of two different refractive indices; for example, eight layers comprising MgO of thickness 216 nm interleaved by seven layers of $MgF_2$ of thickness 264 nm. The layers are deposited, for example, by chemical vapor deposition or any other convenient process to provide a relatively homogeneous transparent layer. A coating of the same structure may be used within the beam splitter prisms 340a,340b.

In one embodiment, the probe body 114 is provided as two body portions, 114a,114b. A first portion 114a includes the laser light source and the beam splitter prism 317. A second portion 114b includes the grating 300 and pivotal mounting 121 for the support arm 123. The prism 317 is solidly mounted within the first body portion 114a, and the laser and lens assembly 311,312 and half wave plate 319 are mounted therein so as permit limited movement in all three planes and axial rotation.

The first step is to center the light beam from the laser along the central optical axis of the prism 317. To achieve this, the first body portion 114a is mounted in a jig, as is an alignment telescope 1000 with an auto reflection facility and an x/y aligned graticule. The cylindrical lens 318 is initially absent from the assembly. Using the auto reflection setting of the telescope 1000, the body 114 is aligned in the jig so that the base face 360 of the prism 317 is normal to the axis of the telescope. The position of the body 114a within the plane normal to the axis of the telescope (the x/y plane) is then adjusted until the center of the prism face 360 is aligned with the axis of the telescope.

The telescope is then focused on the face 360 of the prism. The laser 311 is switched on, giving an elliptical beam spot. The laser is rotated until the ellipse lies in the y/z plane.

The telescope 1000 is then focused at infinity. The position of the laser 312 within the body 114a is then adjusted in the x and y directions until the spot of light from the laser 312 arrives in the center of the graticule of the telescope 1000. The laser 312 is then locked in position within the body 114a, for example, by cementing the laser thereto with adhesive.

The cylindrical lens 318 is then introduced into the body 114a within the beam path of the laser beam, and its position in the y direction is adjusted until a line focus is observed with the telescope 1000. The alignment of the lens 318 is then adjusted until the beam lies along the x axis graticule within the telescope. The cylindrical lens 318 is now correctly positioned and is cemented or otherwise locked in place.

The first body portion 114a is now correctly aligned. The next step is to assemble the two portions 114a,114b. The two portions 114a,114b are connected through a connection mechanism which initially allows some movement in the x and y directions, and rotation about the z axis. For example, the two portions may have facing flanges resiliently urged together. The second body portion 114b is mounted in a jig, and the position of the first portion 114a is adjusted in the "x" direction, whilst observing the spot of the laser beam, until the beam lands centrally on the grating 300.

One of the beam splitter analyzers 340a is removed, and the two beams respectively reflected from and transmitted through the dichroic layer 335 are observed, either by eye on a piece of card or using an optical power meter. The half wave plate 319 is rotated until the intensities of the two beams are equal.

The body portion 114b is then translated in the "y" direction until the two beams are observed aligned in the y direction. At this point, the laser beam is impinging normally to the surface of the grating 300.

The body portion 114b is then rotated around the "z" axis, to align the grating lines with the beam splitter prism. The body portion is rotated until the two beams displayed on the piece of card are seen to overlap. The two beams should now interfere, and bright and dark fringes should be observed on displacing the stylus or probe 130. If clear fringes are not observed, the above steps of alignment in the y direction and rotation around the z axis are repeated.

When clear fringes are seen, the analyzer beam splitter prism 340a is cemented in place once more, and the outputs of a pair of detectors 342a,342b are connected to an oscilloscope. The probe 130 is then displaced, and the fringes generated are observed on the oscilloscope; the half wave plate 319 is adjusted, if necessary, to improve the fringe amplitude and then cemented into place. The phases of the two detector outputs are observed, and the quarter wave plate 350 is rotated until the correct 90° phase difference is obtained; the quarter wave place 350 is then cemented into plate.

The two body portions 114a,114b are then secured together rigidly, typically by adjesive cement, and the gauge is now fully aligned.

Figure 17:
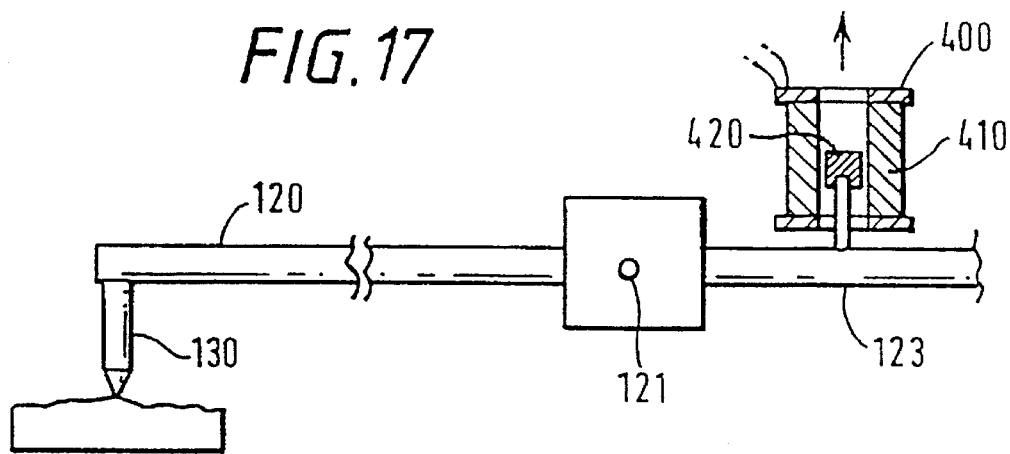
FIG. 17 shows schematically a portion of FIGS. 6 and 7 in greater detail, according to a preferred embodiment of the invention.

Referring to FIG. 17, in this embodiment the biassing or urging force supplied to the probe 130 is provided by an actuating means rather than by gravity as in the prior art. The actuating means 400 comprises an electrical actuator consisting of a linear coil 410 surrounding a pole piece or armature 420 comprising a bar connected rigidly to the support arm 123 inwardly of the pivot 121.

The coil 410 can be energized to provide a constant biassing force through the pole piece 420 to the arm 123 and hence probe 130, but the energizing current could also be controlled to vary the applied force continuously if required, for example in response to a signal derived from a strain gauge or accelerometer responsive to load or acceleration on the probe.

It may be desirable to provide means for manually changing the force applied so that, for example, a relatively high force is applied to substantially rigid surfaces to be measured (so as to provide good contact thereto) but a relatively low force is provided when measuring elastically or plastically deformable surfaces so as to avoid deformation or damage thereto.

It is particularly convenient to control the biassing force electrically, but a mechanical spring (tension or compression) or a pneumatic actuator, for example, could be substituted for the coil 410 and pole piece 420.

By applying current in the opposite direction to that used to bias the probe, the probe can be lifted from the work surface to allow the probe to be returned after a scan without damaging the probe or surface.

Equally, it will be appreciated that this aspect of the invention is not limited in its application to interferometric surface measurement instruments but could equally apply, for example, to inductive pickup type measuring apparatus including a probe. Rather than acting on the support arm after the pivot 121, it would be possible to provide the biassing means 400 prior to the pivot 121 to act on the support arm 120; however, this reduces the effective length of the arm 120, which limits the usefulness of the apparatus in probing enclosed surfaces such as tubes or orifices.

Figure 18:
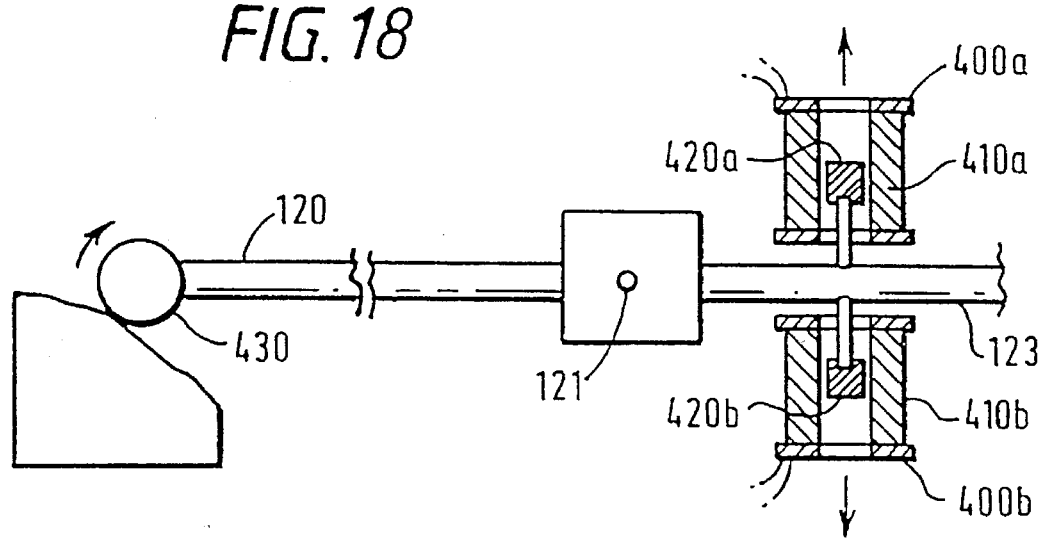
FIG. 18 shows an alternative embodiment to that of FIG. 17.

FIG. 18 shows an alternative arrangement in which a pair of oppositely acting actuators 400a,400b comprising, in this embodiment, coils 410a,410b energized in opposite directions and corresponding pole pieces 420a,420b are connected on opposed sides of the support arm 123. If the energization of the coils 410a,410b is controlled so that the forces exerted by the two actuators 400a,400b are in balance (or, preferably, the upward and downward forces exerted by the actuators 400a,400b and gravity are in balance) the probe 130 will be urged to occupy a central rest or null position. This embodiment finds application in apparatus for measuring surfaces which may be positioned either above or below the apparatus, or normal thereto.

Figure 19:
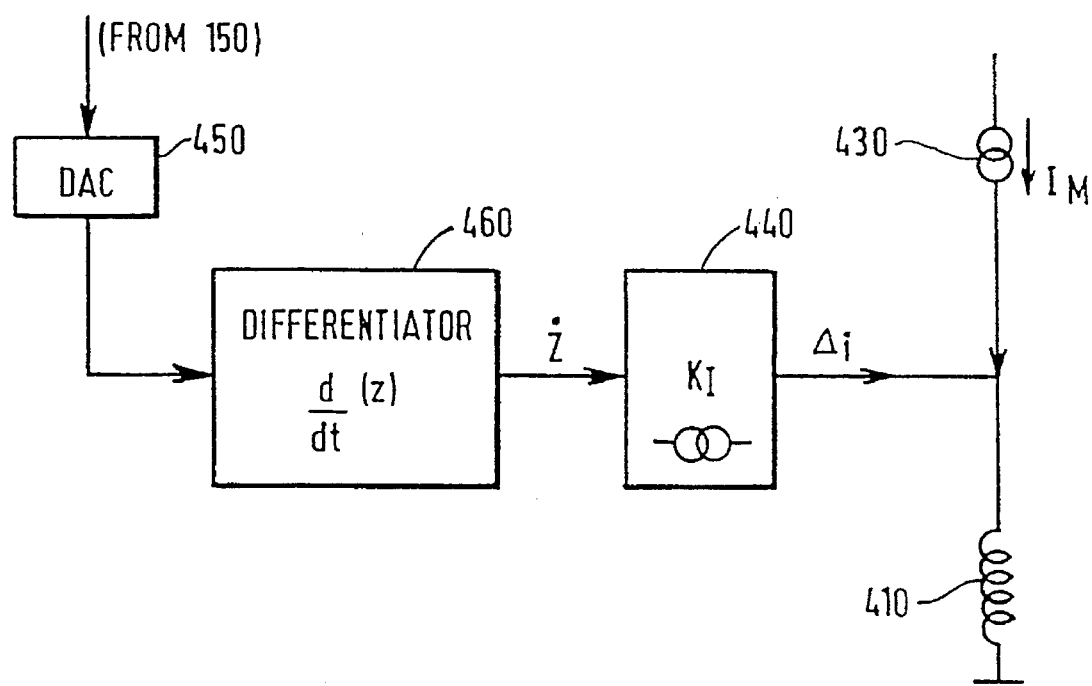
FIG. 19 shows a supplementary embodiment to that of FIGS. 17 and 18.

Referring to FIG. 19, in a further embodiment the actuator is arranged to provide active damping of the stylus arm motion; amongst other advantages, this reduces the seriousness of vibrations due to external influences such as accidental impacts with the apparatus. The coil 410 is therefore fed with a current which includes a component which is proportional to the rate of change of the probe displacement, and of a polarity such that the force caused thereby through the coil 410 opposes the cursor displacement.

For example, the current may be provided by a first current source 430 providing a constant current $I_m$ and a second current source 440 producing a current which is, as discussed above, proportional to the rate of change of the probe displacement signal.

For example, the digital output representing probe displacement Z may be derived from the output of signal processing circuit as discussed in greater detail below, and converted to a corresponding analog signal by a digital to analog converter 450, and then differentiated by an analog differentiator 460 comprising, for example, an operational amplifier having a capacitor at the (inverting) input thereof and a resistor in the feedback path to the inverting input.

The signal from the differentiator 460 is then converted to a current signal through a current follower comprising the current source 440, the output of which is added to the constant current from the source 430 and fed to the coil 410.

It will be recognized, however, that a digital differentiator could be substituted for the analog differentiator, in which case the digital to analog converter 450 is positioned subsequent thereto. Other ways of providing a signal to control the actuator 410 to damp the motion of the stylus will equally be apparent.

Preferably, a control for varying the force applied by the actuators is provided; preferably, in this embodiment not only the magnitude of the force applied by the actuators but also the balance between the force applied by each may be varied so that the apparatus may be urged either downwardly to measure a surface below the probe 130 or upwardly to measure a surface above the probe 130. This embodiment is likewise not limited in its application to interferometric measuring apparatus.

From the foregoing description of an embodiment, it will be clear that a number of variations and substitutions may be made to the optical system with more or less equivalent effect. Some exemplary such modifications and alternative constructions will now be illustrated with reference to the following FIGS. 20 to 24, in which parts corresponding to those described above are correspondingly numbered alike. In FIGS. 20, 22, 23 and 24 the prism has parallel sides for illustrative purposes; this requires a more complex coating 335 if the angle of incidence thereon is not 45°, but the parallel sides are easier to make.

Referring to FIG. 20, the optical arrangement of FIGS. 6 and 7 may be varied by substituting the reflective diffraction grating 300 described with reference to FIG. 11 with a transparent or partly transparent grating. The light source 310 produces a beam which is directed through the body 300 of the grating component onto the inner surface of the grating 301 which acts as a transmission grating and transmits diffracted first order beams along the same paths as above described with reference to FIG. 7 into the beam splitter prism 317. The construction of the beam splitter prism 317 is thus slightly simplified compared to those shown in FIGS. 21 and 23 in that no recess or beam translation prism 316 is required.

A mirror 500 is provided to direct the beam from the light source 310 into the diffraction grating. Since the curved diffraction grating component 300 now acts as a lens, tending to converge the beam incident thereon, the converging lens 318 of FIG. 7 is replaced by a diverging lens 518 to compensate for this and provide collimated diffracted beams. Alternatively, since many diode lasers produce diverging beams, the laser diode 311 may be selected so that its divergence compensates the convergence of the diffraction grating component 300, or the rear surface of the grating 300 may itself be curved for this purpose.

Referring to FIG. 21, in a particularly preferred embodiment the arrangement is essentially as in FIGS. 6, 7 and 14 except for the apex of the prism and the consequential provision of the recess or beam translation prism 316 and the location of the cylindrical shaped lens 318.

Referring to FIG. 22, the light source 310 and prism etc 317 in the arrangement of FIG. 20 may be transposed; again, a diverging lens 518 or diverging light source 310 are employed to compensate for the convergence due to the grating curvature.

Figure 23:
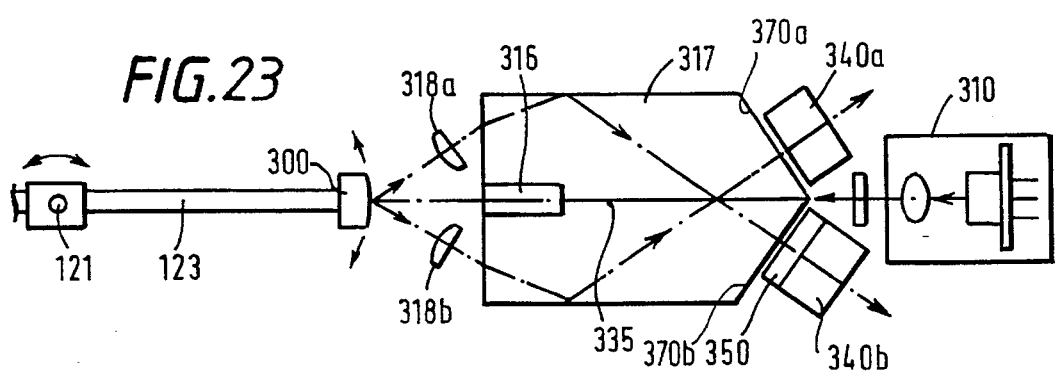
FIG. 23 shows schematically a fourth alternative embodiment to that of FIGS. 5 to 7.

Referring to FIG. 23, the cylindrical lens 318 in the light path between the light source 310 and the diffraction grating 300 may be replaced by a pair of cylindrical lenses 318a, 318b in the paths of the diffracted beams, to much the same effect.

Figure 24:
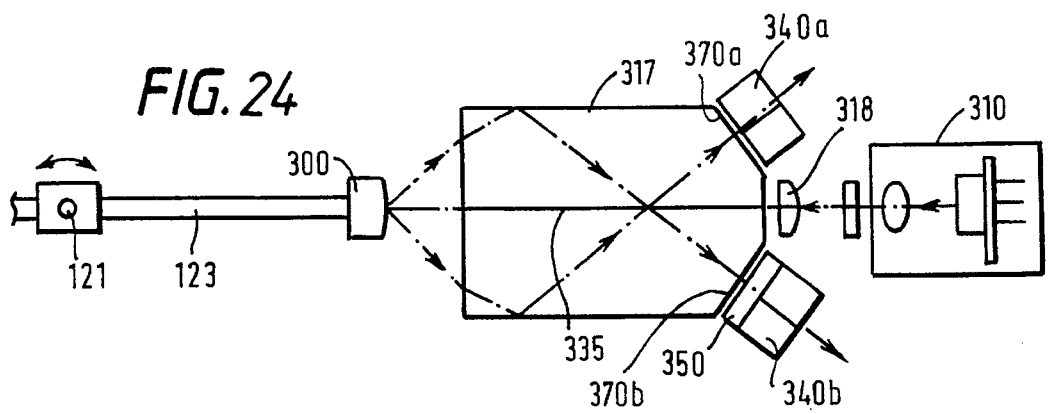
FIG. 24 shows schematically a fifth alternative embodiment to that of FIGS. 5 to 7.

Referring to FIG. 24, the arrangement for directing the incident light from the light source 310 to the grating 300 may be simplified by the omission of the beam translation prism 316 and replacement of the apex of the pyramid 317 with a flat surface normal to the light beam from the light source 310 which is accurately aligned along the middle of the center plane 335 of the prism 317. This simplifies the arrangement, but requires accurate alignment of the incident beam from the light source 310 with the center plane 335 in order that the beam splitting properties of the dichroic central layer 335 do not affect the incident beam.

In addition to all the above arrangements, it would also be possible to provide the curved diffraction grating on the outward side of the pivot 121 (i.e on the support member 120). This arrangement would, however, reduce the effective length of the support arm 120 and hence the applicability of the probe to some types of component (such as tubes) where a long support arm 120 is required. Many other variations will also be apparent.

It would be possible to provide analog output ports 150 carrying the analog signals from each of the detectors 341a,341b,342a,342b, or even to provide optical output ports 150 to which the beams received at the position at which the detectors are located are carried by means of optical fiber cables. Alternatively, the compact construction enabled by the relatively small size of the laser and interferometer in the embodiment described above make it possible to provide some electrical signal processing within the same unit, reducing the possibility of electrical or radio frequency interference and enhancing the versatility of the apparatus. Since the output signals produced by the apparatus described above are similar in nature to those produced by conventional Michelson interferometer measurement apparatus, signal processing circuitry employed with that type of apparatus could equally be used with the above described preferred embodiments. Likewise the preferred signal processing apparatus described hereafter could be used with conventional interferometers of the Michelson type.

Figure 25:
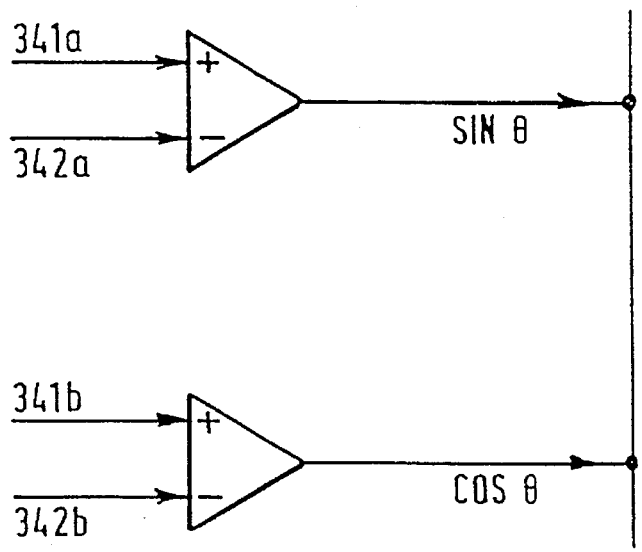
FIG. 25 shows schematically a first signal processing circuit for use with the above embodiments.

Referring to FIG. 25, however, in one specific construction of this embodiment, the outputs of the detectors 341a, 341b, 342a, 342b are subtracted to form sine and cosine signals by a pair of differential amplifier circuits, and these two signals are supplied to the output ports 150 of the traversing unit 110. Much of the signal processor unit 155 is then conveniently co-located with a computer terminal 160.

Figure 26:
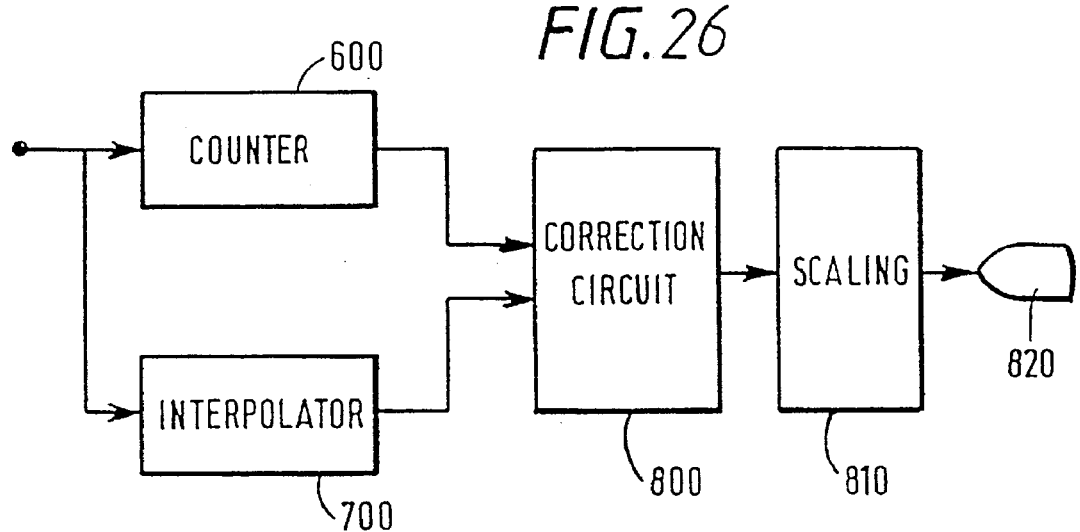
FIG. 26 shows schematically a second signal processing output circuit for use with that of FIG. 25.

Referring to FIG. 26, in a preferred embodiment of this aspect of the invention the signal processing circuit 155 comprises a fringe counter circuit 600 arranged to keep a count representing the total number of peaks or troughs in amplitude detected at the output of an interferometric gauge apparatus such as that previously described and an interpolator 700 arranged to generate an output representing the phase position, between such peaks or troughs, of output signal. The low resolution data from the counter 600 and the high resolution data from the interpolator 700 are combined and supplied to a linearity correction circuit 800 and a scaling circuit 810 and then output either for data processing, or to a store means, or to a display 820 as shown. Conveniently, the correction circuit 800 and scaling circuit 810 are both provided by the computer 160 operating under stored program control.

Figure 27:
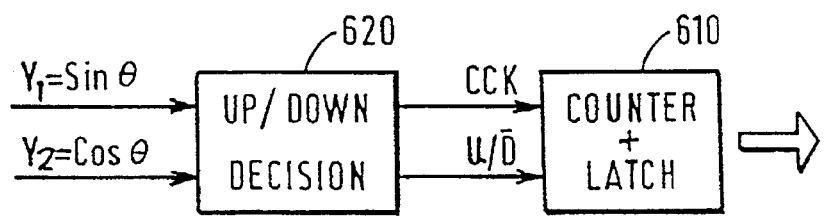
FIG. 27 shows in greater detail the structure of a counter forming part of the circuit of FIG. 26.

Referring to FIG. 27, the counter circuit 600 is shown in greater detail. The counter circuit 600 comprises a digital counter with latched output 610, such as, for example, a 16 bit counter and a decision circuit 620 which controls the counter 610 to count either up or down. This is necessary because the displacement of the probe is derived, as discussed below, from the number of fringes counted, but fringes counted in response to movement in one direction need to be subtracted from those counted in response to movement in the opposite direction in order to derive a measure of displacement.

This is especially necessary where, as described above, the fringe count is a nonlinear function of position.

The decision circuit 620 therefore outputs a control signal to the counter 610 indicating whether the latched count should be incremented or decremented in response to the next fringe counted. On detection of a fringe, an enabling signal is supplied to the counter 610 to cause the count to be incremented or decremented accordingly.

So that the decision circuit 620 can decide whether to increment or decrement the count, it receives two separate inputs spaced apart in phase. The necessary signal processing is simplified if the two signals are spaced apart in phase by 90°. Referring to FIG. 9C, it will be apparent that the variation of signal amplitude with probe position x is generally sinusoidal, satisfying a relationship y=sin θ, where θ is proportional to distance x and, for the above discussed grating interferometer, θ=4 πx/D where D is the period of the grating. The two signals $y_1$ and $y_2$ received by the up/down decision circuit 620 are therefore, relative to some arbitrary starting phase, given by A sin θ and A cos θ and will be referred to hereafter as sin θ and cos θ signals respectively.

Figure 28:
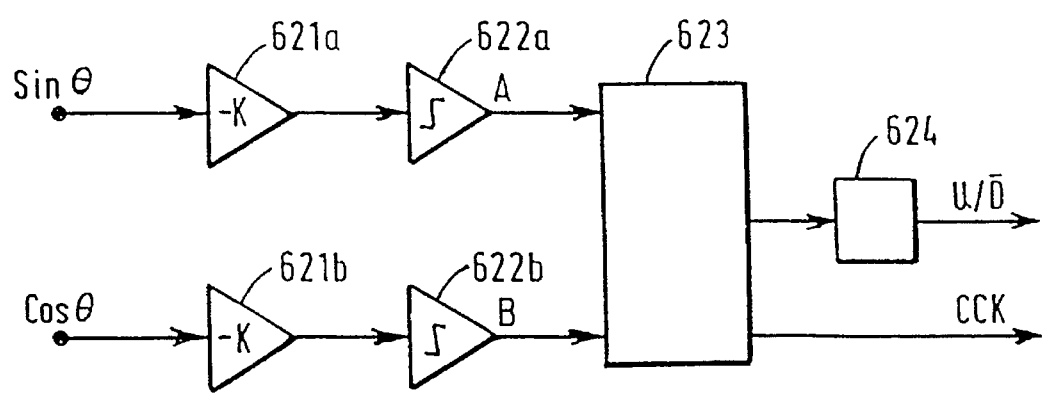
FIG. 28 shows schematically in greater detail a part of the circuit of FIG. 27.

Referring to FIG. 28, the decision circuit 620 in a preferred embodiment comprises a pair of input amplifiers 621a, 621b, for example inverting operational amplifier circuits, with a gain K sufficient to scale the input signals to a suitable level for the subsequent circuitry.

For example, for use with the above described apparatus, the gains may be −2.4 bringing the peak to peak outputs of the amplifiers 621a, 621b to 10 v. The amplifiers 621a, 621b may also include bandwidth limiting filters, passing frequencies from 0 Hz to a maximum limit (for example, 5 MHz for reasons discussed below).

The outputs of the amplifiers 621a, 621b are supplied to comparators 622a, 622b (for example inverting comparators set to provide a logic high or low output in dependence upon whether the respective input signal is respectively below or above 0). Generally, such comparators include a limited amount of hysteresis between threshold levels; if the counter circuit is to work with interpolator circuit 700 in the manner described in greater detail below it is necessary to constrain the threshold levels to lie within the smallest level resolvable by the interpolator circuit 700. For an interpolator resolution, in degrees, of 360/256 the threshold is (10/2).sin(360/256)=123 mV where the peak to peak voltage is 10 V.

Figure 29:
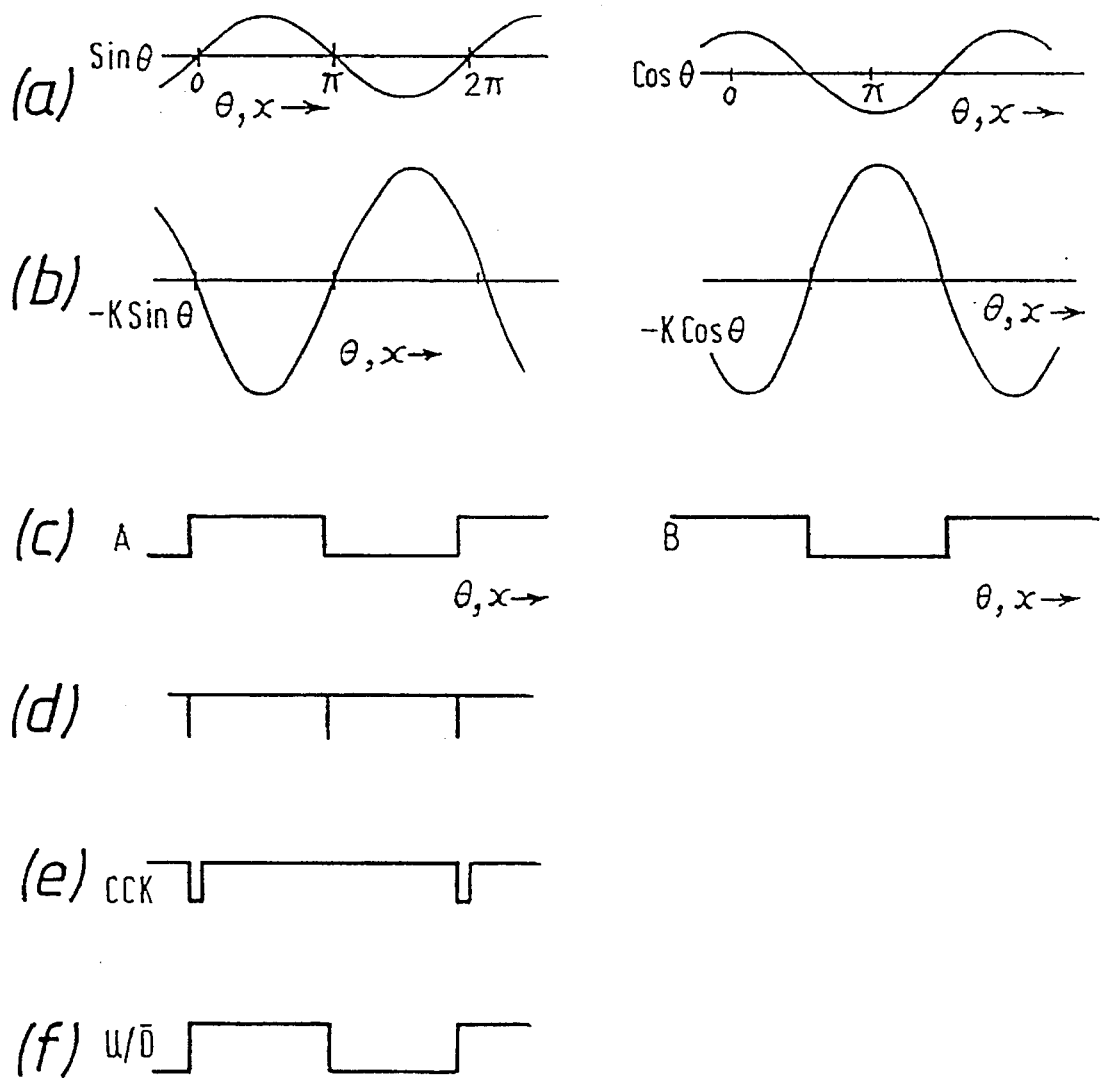
FIGS. 29A–F shows schematically signals at points of the circuit of FIG. 28.

Referring to FIG. 29, FIG. 29A shows a graph of the two input signals with probe or interferometer position, and thus corresponds to FIG. 9C. FIG. 29B shows, correspondingly, the variations of the outputs of the amplifiers 621a, 621b with probe position x or phase angle θ. Likewise, FIG. 29C shows the output of the comparators 622a, 622b corresponding to probe distance or phase; the outputs of the comparators exhibit transitions at the 0 crossing points of the input signals.

FIGS. 29A–29C do not, however, represent the signals at these stages of the circuit over time; each signal may be static or varying, depending on whether the probe is static or moving. If the probe moves in a first direction corresponding to an increasing probe distance x (for example the probe rises) and hence an increasing phase θ at a constant velocity the input signals, outputs of the amplifiers 621a, 621b, and outputs of the comparators 622a, 622b will correspond to FIGS. 29A–29C. If the probe is static, all signals will be constant. If the probe changes direction and travels backwards (i.e in the negative x direction ) the corresponding signals at the outputs of the amplifiers and comparators will now correspond to a mirror reversed version of those illustrated in FIGS. 29A–29C.

The comparators 622a, 622b are arranged to detect the zero crossing points of the signals from the interferometer; this is an advantageous way of counting fringes since it is largely immune to variations in the input signal amplitudes, and it provides a precisely defined phase point in the signal at which each fringe is counted, which increases the accuracy of the counter. Moreover, there are particular advantages when this type of counter is employed with an interpolator circuit 700 since as well as counting fringes, the circuit 600 provides closely defined phase reference points.

A first problem is to establish which direction the probe is travelling in, and consequently whether the count is to be incremented or decremented in response to a zero crossing. If the zero crossing of the sin θ input is that occurring at θ=0°, and the probe is moving in the positive x direction (that is, θ, the phase, is increasing), then the value of the signal immediately after the zero crossing will be positive. If the zero crossing, on the other hand, is that occurring at θ=π then the value of the signal immediately after the zero crossing will be negative. Conversely if the probe is travelling in the opposite direction, then the amplitude of the signal immediately after the θ=0 zero crossing will be negative and that immediately after the θ=π zero crossing will be positive.

Thus, provided it is established which phase position a given zero crossing corresponds to, the direction of travel of the probe can be determined by measuring the amplitude of the signal immediately after the zero crossing. To determine whether the zero crossing is a θ=0 point or a θ=π point, the value of the cosine signal is examined.

The circuit of FIG. 28 thus comprises two further elements; a phase resolving circuit 623 for generating a signal indicating whether a given zero crossing is 0° or π°, and a direction determining circuit 624 indicating whether a given zero crossing is a rising transition or a falling transition, corresponding, respectively, to forward and backward travel of the probe.

Figure 30:
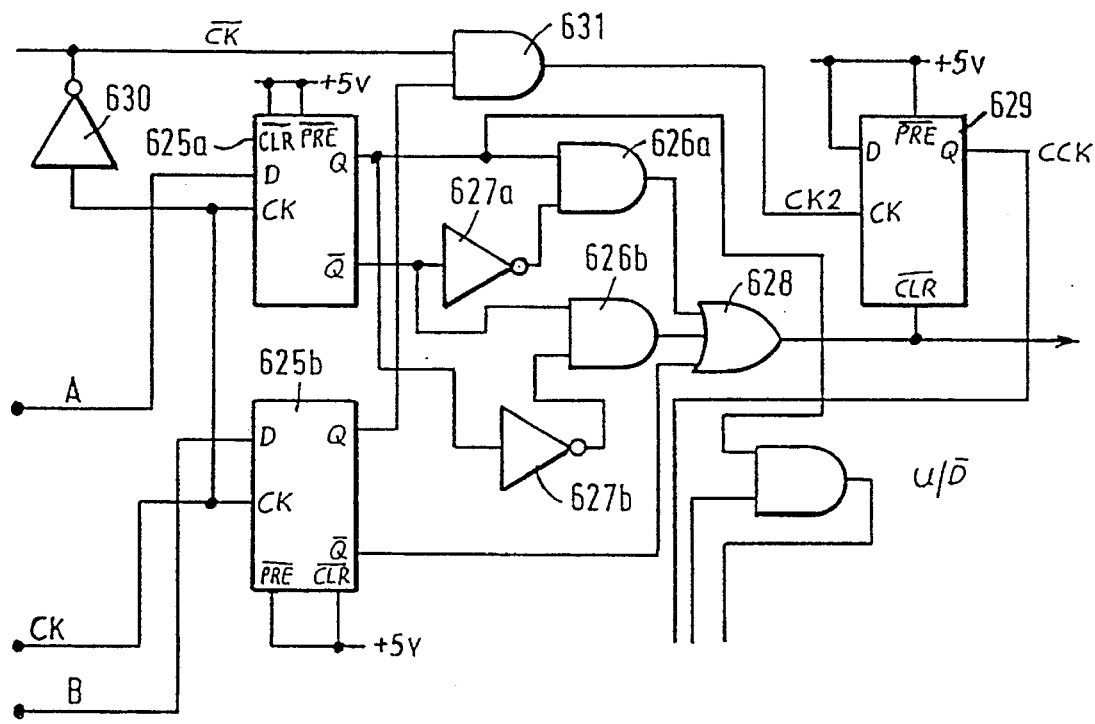
FIG. 30 shows in greater detail a portion of the circuit of FIG. 29.

Referring to FIG. 30, the zero crossing phase decision circuit 623 in a preferred embodiment comprises a pair of latches 625a,625b comprising D type flip flops, clocked by a 10 MHz clock signal from a crystal oscillator, so as to latch the state of the signal from the comparators 622a, 622b on the positive going edge of the clock signal. The frequency response of the latches is therefore limited to 5 MHz, and to prevent aliasing, this is the frequency above which the filters within the amplifiers 621a,621b should be selected to cut.

The outputs of the sin θ latch 625a are fed, via a logic network comprising a pair of AND gates 626a,626b and a pair of invertors 627a,627b, to an OR gate 628. The output of a first AND gate 626a tracks the normal output of the latch 625a and the output of the second 625b tracks the inverted output of the latch 625a.

The inverted output of the cos θ latch 625b is fed to a third input of the OR gate 628. The signal at this input to the OR gate is therefore an inversion of the signal B shown in FIG. 29C. When this signal is low, the difference in the switching times of the AND gates 626a,626b causes a short period when the outputs of both are low and hence a short duration negative going pulse in the otherwise high output of the OR gate 628. When the output of the latch 625b is high, however, the output of the OR gate 628 remains high. The output of the latch 625b, connected to receive the squared version of the cos θ signal, acts to select those zero crossings which correspond to θ=0.

The output of the OR gate 628 shown in FIG. 29D is applied to the CLEAR input of a further latch 629 which is set high again by the clock signal fed via the inverter 630 and gated by the noninverting output of the latch 625b through an AND gate 631. The output of the latch 629 therefore goes low with the occurrence of the negative going pulse on the output of the OR gate 628 (following the positive going clock pulse which clocked the latches 625a,625b), and goes high once more on the following negative going clock signal edge. The output of the latch 629 is therefore a negative going pulse of duration 0.1 microseconds each 0° phase zero crossing of the sin θ input signal from the gauge, as shown in FIG. 29E.

The circuit 624 for selecting whether to count up or to count down needs to ascertain whether the state of the signal A is rising or falling at the θ=0 crossing. This can simply be derived from the output of the latch 625a.

The clock signal shown in FIG. 29E and the up/down counting control signal shown in FIG. 29F are then supplied to the corresponding inputs of a digital counter chip comprising the counter 610; for example, a pair of 74 AS 867 counter chips.

Interpolator 700

Figure 31:
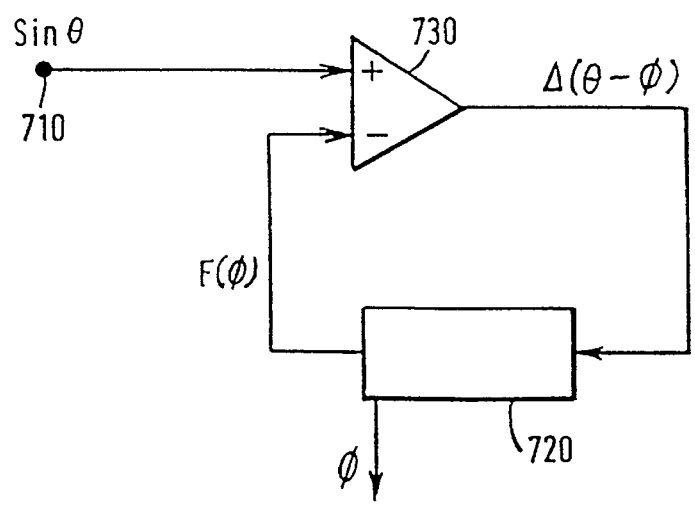
FIG. 31 shows schematically the general structure of an interpolator circuit forming part of the circuit of FIG. 26.

Referring to FIG. 31, the interpolator 700 in this aspect of the invention comprises an input 710 receiving the sin θ signal from the interferometer, an estimator circuit 720 for producing a signal φ representing an estimate of the phase θ of the input signal at the input 710, and for producing a function of that estimate φ (shown here as F(φ)), and an error generating circuit 730 producing an output signal δ, which is a function of the error between the estimated phase φ and the actual phase θ of the input signal, this error output signal being fed back to control the estimator circuit 720.

Figure 32:
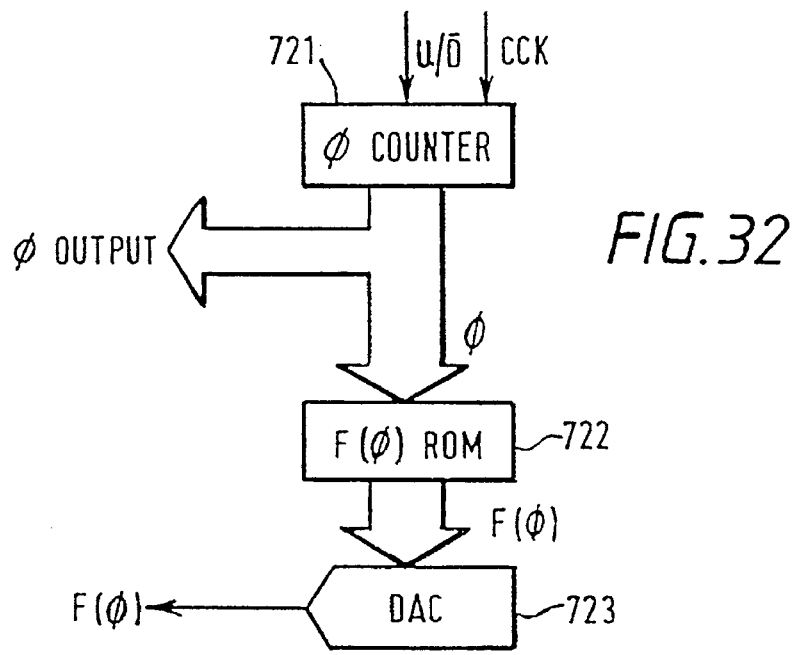
FIG. 32 shows part of the circuit of FIG. 31 in greater detail.

Referring to FIG. 32, one particularly preferred way of providing the estimator and function generator 720 comprises providing a digital counter 721 keeping a count representing the estimated phase φ, and provided with an enabling signal (CCK) for changing the count and a direction indicating signal (U/D) for indicating whether the count is to be incremented or decremented. The output of the counter is thus a digital word representing an estimate φ of the phase θ of the input signal. The output φ is also fed to a digital function generator circuit comprising conveniently a read only memory embodying a look up table storing, for each value of φ, a corresponding value of the function F(φ). The data output of the lookup table 722 is coupled to the digital input of a digital to analog convertor 723 which correspondingly generates an analog output representing the value of the function F(100 ).

If the circuit shown in FIG. 32, with the function F(φ)=sin (φ), were employed as shown in FIG. 31, and the error signal generator 730 acted merely as a subtractor, the output δ would be:

$$\delta = \sin\theta - \sin\phi,$$

or $$\delta = 2\cos((\theta+\phi)/2).\sin((\theta-\phi)/2)$$

Since θ will be approximated by φ, this simplifies to δ=(cos φ)(θ−φ).

In other words, the value of the error signal δ is a function not only of the difference between the estimated phase φ and the actual phase θ, which is the desired error measure, but also of the actual phase θ or φ. Thus, to employ this error signal as a control signal for incrementing the counter 721, it would be necessary to provide a test threshold which varied with the value of φ or θ.

Figure 33:
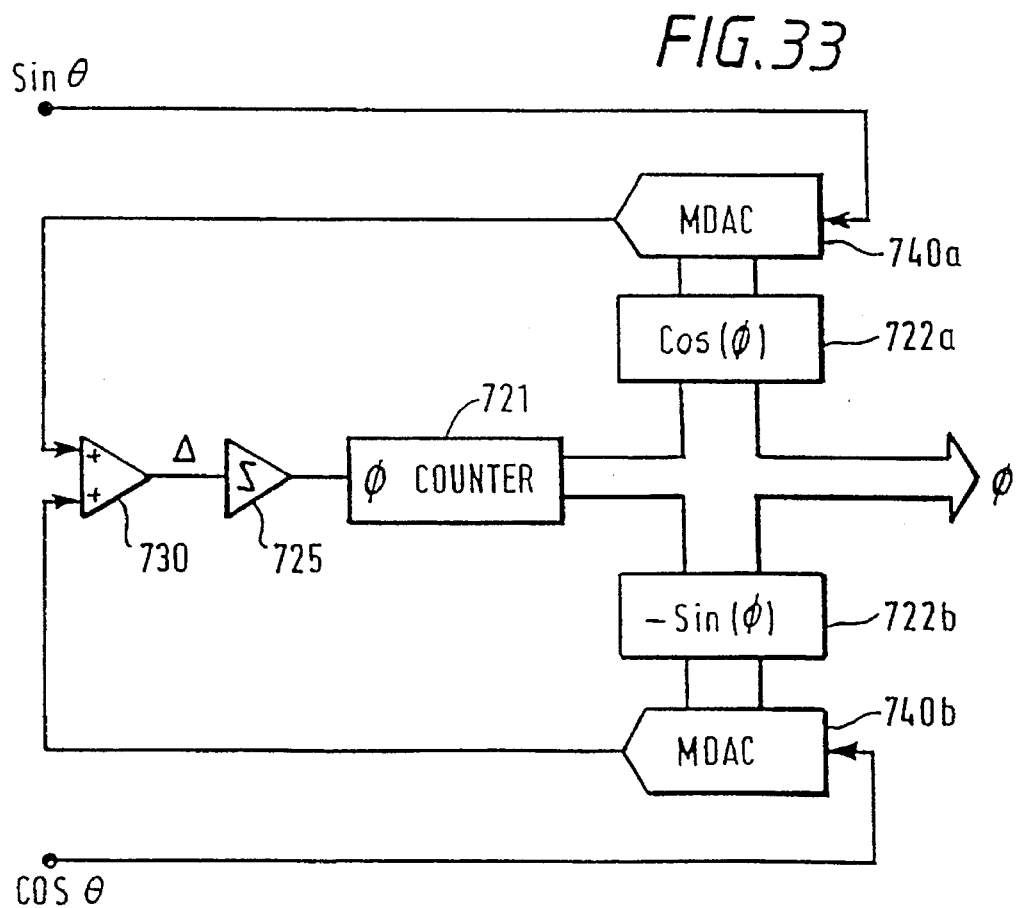
FIG. 33 shows schematically the structure of an interpolator according to a first embodiment.

Referring to FIG. 33, an alternative realization of the principle illustrated in FIG. 31 operates to derive an error signal δ which is a function only of the difference between the input phase θ and the estimated phase φ. For this purpose, both the sin θ and cos θ input signals from the interferometer are employed. As in FIG. 32, a digital counter 721 latches a number representing the value of the estimated phase φ, and this number comprises the output of the circuit 700. This number is also supplied to the address buses of a pair of ROMs 722a, 722b each storing a lookup table representing, respectively, a digital number corresponding to the cosine and sine of the estimated phase φ (in other words, a table of constants between −1 and +1). For example, the counter 721 may be an 8-bit counter and the ROMs 722a, 722b may each contain 256 8-bit numbers one corresponding to each possible value of φ.

The data buses of the ROMs 722a,722b are coupled to the digital input lines of a pair of respective multiplying digital to analog convertors 740a,740b each including a resistance ladder, switchable in accordance with its digital inputs to apply a corresponding resistance to a received analog current, and hence attenuate the current by an amount proportional to the digital input to the multiplying DAC. The multiplying DAC 740a is coupled to the sin θ input of the interpolator 700, and consequently produces an analog output current proportional to sin θ cos φ. The multiplying DAC

740b is coupled to receive the cos θ input to the interpolator 700, and correspondingly generates an analog output proportional to cos θ sin φ. The error signal generating circuit 730 comprises a subtractor circuit generating an output proportional to:

$$\sin \theta \cos \phi - \cos \theta \sin \phi = \sin(\theta - \phi).$$

This signal is supplied to a comparator circuit 725 which generates an output to increment or decrement the counter 721 whenever the value of the error signal θ−φ exceeds a predetermined threshold corresponding to one least significant bit within the phase counter 721 the threshold being given, as before, by Vpp/2.sin(360/256)=123 mV for Vpp= 10V. The counter 721 is preferably arranged to count up to, and hence divide the phase of the incoming signal into a sufficiently high number that the value of the signal:

$$\delta = \sin(\phi - \phi)$$

is approximately equal to $$\theta - \phi;$$

for example, if the counter 721 is a 4-bit counter, each counter increment will correspond to a 22.5° phase shift and the comparator 725 will cause the counter 721 to increment when the estimated phase φ diverges from the true phase by 22.5°. At 22.5°, sin X is not a satisfactory approximation to X and so the counter 721 will be incremented at points which do not precisely correspond to regularly spaced phase intervals. On the other hand, where the counter 721 is an 8-bit counter, the maximum phase lag between the estimated phase φ and the signal phase θ will occur at $$\sin \theta = 360/256 = 1.4°.$$

Over the range $$0-1.4°, \sin(\theta - \phi)$$

is a very good approximation to θ−φ.

Figure 34:
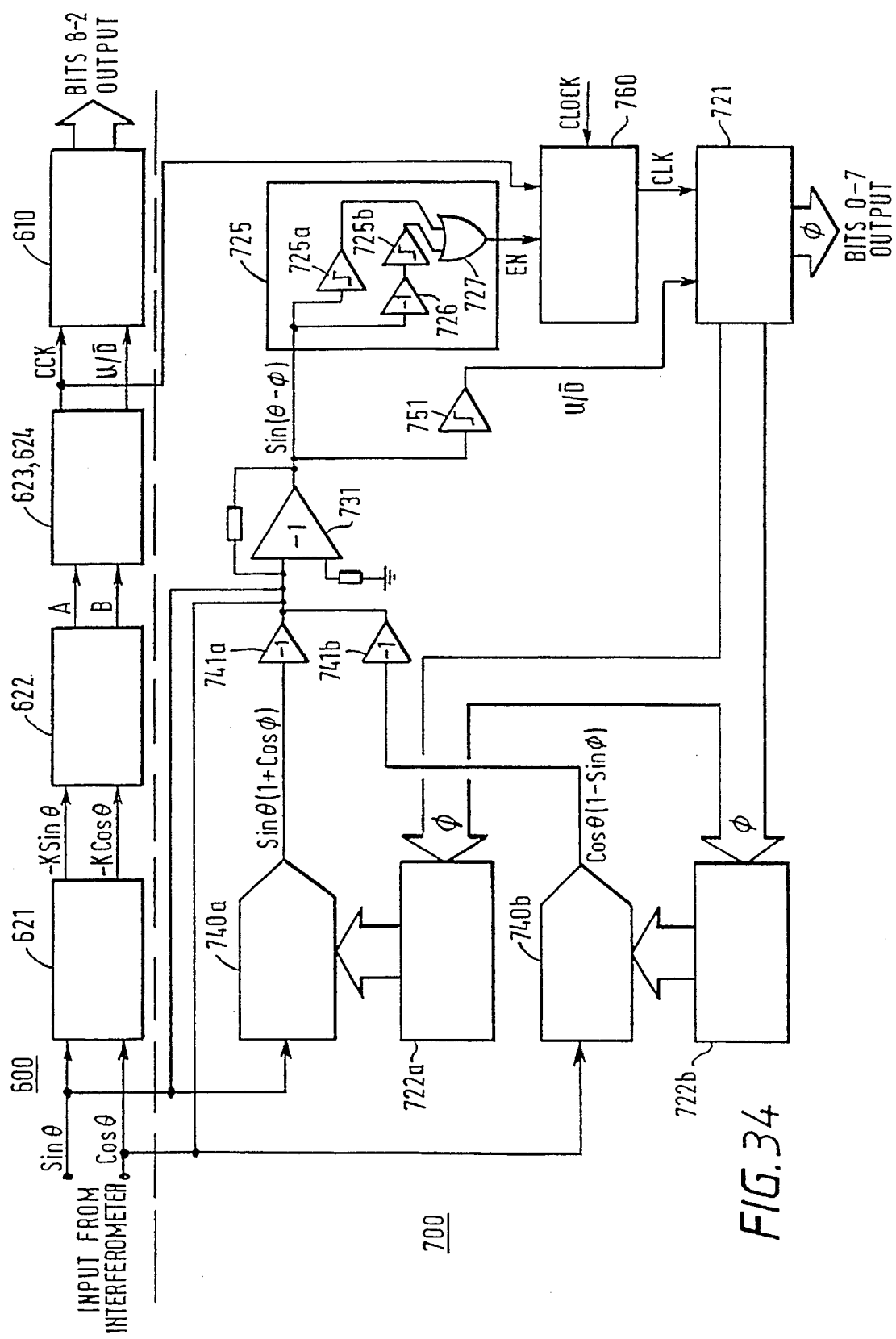
FIG. 34 shows schematically an interpolator circuit according to a preferred embodiment of the invention, together with a counter circuit.

Referring to FIG. 34, it may be preferred to store only positive numbers in the lookup tables 722a,722b. Accordingly, the function values stored in the ROMs may instead represent 1+cos φ and 1−sin φ (with values between 0 and +2). The additional sin θ and cos θ terms in the output of the multiplying DACs 740a,740b are removed by subtracting from the output thereof the input sin θ and cos θ values.

An offset of half one least significant bit, 0.7°, may be added to φ so that the tables store 1+cos (φ+0.7) 1−sin (φ+0.7), to provide rounding up.

Accordingly, the interpolator 700 further comprises a pair of buffer amplifiers 741a,741b comprising, for example, inverting op-amp circuits, having gains of −1. The outputs of the amplifiers 741a,741b, together with the inputs sin θ and cos θ signals, are summed at the inverting terminal of a unity gain inverting op-amp 731 which therefore generates an output corresponding to $$\sin \theta \cos \phi - \cos \theta \sin \phi = \sin(\theta - \phi) = \theta - \phi.$$

Where the stored values include an offset, as discussed above, the output corresponds to θ−φ−OFFSET.

The polarity of this error signal (representing whether the estimate leads or lags the desired phase θ) is sensed by a comparator 751, the logic output of which controls the up/down count input of the counter 721.

The error signal is also fed to the comparator circuit 725, which comprises a first comparator, 725a having a predetermined threshold corresponding to one least significant bit of the counter 721, and a second comparator 725b having an identical threshold but preceded by an inverting op-amp with unity gain 726. The comparator 725a therefore produces an output signal when the error exceeds a positive predetermined threshold, and the comparator 725b produces an output signal when the error signal exceeds a corresponding negative threshold.

The outputs of the two comparators 725a,725b are fed to a logic circuit 727 performing an OR function so as to cause a signal EN for changing the count of the counter 721 when either comparator indicates that its threshold has been exceeded. The 10 MHz master clock signal is supplied to a synchronization logic circuit 760 which retimes (e.g latches and delays) the signal from the comparator circuit 725 to correspond to a correct phase of the master clock. The synchronization logic circuit 760 is connected to the count enable input of the clock 721 to cause a corresponding increment or decrement of the latched clock count representing the estimated phase φ.

The synchronization logic circuit 760 is arranged to divide the master clock frequency by 10 before applying a signal from the comparator circuit 725 to the input of the counter 721, so that the counter 721 can only be incremented once each microsecond. The reason for this is to prevent switching of the counter 721 due to spurious transient values of the error signal which are caused by switching within the multiplying DACs 740a,740b; without means for preventing such transients, it would be possible for a change in the count value of the counter 721 to cause switching transients in the outputs of the DACs 740a,740b which would then change the count value of the counter once more. However, other means of limiting the response of the system to such transients are possible (for example low pass filtering within the analog circuit path).

In the circuit of FIG. 34, it is found that the settling times necessary for allowing such transients to die away is the factor limiting the speed of the interpolator. A settling time of 1 microsecond, with an 8-bit counter giving 256 values of φ between adjacent fringes, gives a maximum tracking rate of 3.9 KHz (fringes per second).

By providing a digital estimate of the phase φ, and using digital to analog conversion to compare this in the analog domain with the input signal, it is possible to provide a cost effective and relatively inexpensive interpolator compared to devices which operate by analog to digital conversion of the input signal, since cheap analog to digital convertors are slow, and fast analog to digital convertors are expensive. By providing a digital counter at the digital output device rather than a microprocessor, enhanced speed is likewise provided.

Referring once more to FIGS. 34 and 26, it will thus be seen that the counter 600 and the interpolator 700 work essentially independently. Because of this a problem can occur as the phase θ of the input signal approaches zero. When the interpolator 700 reaches the θ=0 phase point, its output changes between 0 and its maximum value (e.g 256). If this does not occur synchronously with the point at which the fringe counter 600 registers the zero transition and therefore counts and additional fringe, the combined outputs of the interpolator 700 and fringe counter 600 will be in error by one fringe until the counter 600 does so. Because the circuits are independent, there is every likelihood that the points at which each registers the zero phase condition will be different.

Figure 35:
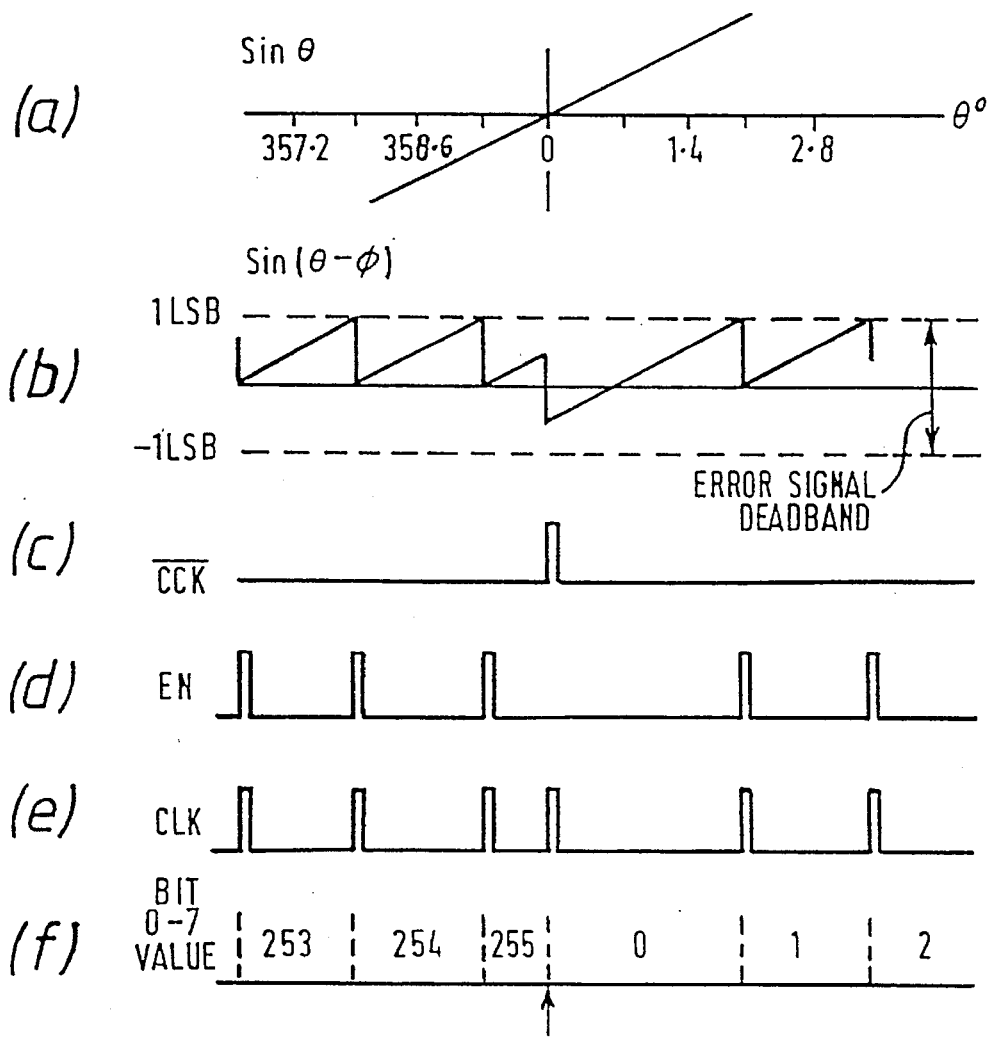
FIGS. 35A–F shows schematically signals at various points of the circuit of FIG. 34.

Further, referring to FIG. 35A, where an offset is stored in the tables as the phase θ passes through zero, the value of θ−φ−OFFSET may not rise to a level sufficient to trigger the comparators 725a,725b before changing polarity. Accordingly, the necessary signal to increment the counter 721 and cause it to restart at 0 is not supplied by comparator circuit 725. To synchronized the counter 600 and interpolator 700, and to ensure that the interpolator 700 responds to the zero phase crossing, the clock signal (CCK) derived within the counter 600 is supplied to the synchronization logic 760 as shown in FIG. 32, and inverted as shown in FIG. 33C to provide an additional switching signal supplied to increment/decrement the counter 721.

Various modifications to the above described counter and interpolator circuitry are possible. For instance, the estimator circuit 720 of FIG. 31 could, rather than comprising a phase counter incremented by the error signal δ, comprise a free running counter the count frequency of which is controlled by the error signal δ. However, in interferometric gauge apparatus for surface or profile measurements this is found undesirable since the response of such embodiments at low or zero frequencies is unstable and inaccurate.

Since the error signal sin(θ–φ) is a close approximation to the phase error θ–φ, it would be possible to digitize this error signal for greater accuracy, adding further less significant bits to the output of the interpolator. Alternatively, the same accuracy could be retained by reducing the number of bits of the counter 721, so as to more coarsely subdivide the phase between fringes, to a level at which sin (θ–φ) still remains a reasonably good approximation to θ–φ and recover the lost accuracy by digitising the difference signal. This could somewhat increase the maximum tracking rate of the interpolator.

Output

Referring to FIG. 34, where the phase angle counter 721 divides the phase between fringes into a number which is a power of 2, the output of the phase counter 721 may be connected to a digital output data bus as the lower order bits 0–7 of a word for which the binary output of the fringe counter 610 comprises the higher order bits.

Where the number of fringes counted is not in an absolutely linear relationship to the distance travelled by a probe or the like, as in the above discussed interferometric measuring apparatus, this digital output bus is connected to a nonlinearity correction circuit 800 shown in FIG. 26, which may simply comprise a read only memory to the address lines of which the digital output word is coupled, producing a corresponding corrected digital word on its data bus lines.

A scaling circuit 810 comprising a digital multiplier (for example, a further ROM lookup table) is provided to convert the corrected output of the correction circuit 800 to units of distance in some convenient form, if necessary. In the above described embodiment, the probe distance corresponding to each fringe to fringe interval is 0.833 μm, and thus each 1/256 phase interval corresponds to 3.25 nm so to convert the corrected number to nanometers the multiplier 810 multiplies by 1/3.25.

Although the correction and scaling circuits 800,810 are shown separate for clarity, in practice they may conveniently comprise the same lookup table ROM performing both correction and scaling. The factor applied by the scaling circuit 810 would be known by computation from the gauge dimensions and geometry, and the nonlinearity correction is conveniently derived in a calibration phase by measuring the digital output words from the counter 600 and interpolator 700 in response to measurement of known surfaces or profiles.

From the foregoing it will be clear that the signal processing circuit 150 comprises the fringe counter 600 and interpolator 700 could be used with other types of interferometric instruments than those hereinbefore described, and in that the interferometric measuring apparatus hereinbefore described could be used with other signal processing circuits.

Furthermore, although it is particularly advantageous to employ a zero crossing detection fringe counter circuit as described hereinbefore in conjunction with the interpolator circuit described above since this provides for accurate phase referencing, each of the fringe circuit and interpolator circuit could be employed separately.

Further, the biassing force means 400 for urging the probe or stylus into contact with an object to be measured are applicable to other types of measuring instrument than those described above; for instance to inductively sensed measuring apparatus. However, when employed together, the above described measuring apparatus with signal processing output circuit can provide an extremely compact unit which can be mounted in a single traverse unit 110 without excessive load on the vertical column thereof, using a low voltage power supply which is safer than those hitherto employed for helium neon lasers, and providing a conveniently digital output, offering dynamic resolution of, for example, as much as $1.8 \times 10^6:1$.

What is claimed:

1. Apparatus for measuring surface characteristics comprising:

a probe for contacting a surface to be measured;

a probe support carrying the probe for allowing pivotal movement of the probe about a pivot axis; and a grating interferometer for providing a measurement of pivotal movement of the probe, the interferometer comprising a diffraction grating disposed on a curved surface coupled to the probe support and having a center of curvature located at the pivot axis.

2. Apparatus according to claim 1, wherein the grating is connected to the probe support further from the probe than is the pivot.

3. Apparatus according to claim 1, wherein there are provided focusing means for optically correcting the optical effects of the grating curvature.

4. Apparatus according to claim 3 wherein the grating is illuminated by a beam from a beam source, and the grating is convex relative to the beam.

5. Apparatus according to claim 4, wherein the focusing means comprises a converging lens between the beam source and the grating.

6. Apparatus according to claim 1, wherein the grating is illuminated by a light beam from a divergent beam source and the grating is concave relative to the beam and causes the light beam incident thereon to converge, the divergence of the beam source and the convergence due to the curved grating being such that the diffracted beams produced by the grating are each substantially parallel.

7. Apparatus according to claim 1, wherein the interferometer comprises means for directing a pair of diffracted beams of equal and opposite order to a combining means producing interference therebetween.

8. Apparatus according to claim 7 wherein the optical path lengths traversed by the two beams to the combining means are substantially equal.

9. Apparatus according to claim 7 in which the directing means comprise two reflective surfaces.

10. Apparatus according to claim 9, wherein the two surfaces comprise external surfaces of a unitary prism.

11. Apparatus according to claim 1, further comprising a semiconductor laser diode illumination source.

12. Apparatus according to claim 1, further comprising an illumination source comprising a generally monochromatic light emitting device filtered by a narrow band filter.

13. Apparatus according to claim 12, wherein the biasing means comprises an electromagnetic actuator.

14. Apparatus according to claim 12, wherein the biasing means comprises a pair of oppositely acting biasing members.

15. Apparatus according to claim 1, further comprising biasing means for biasing the probe in a predetermined direction.

16. Apparatus according to claim 15 wherein the predetermined direction is towards the surface.

17. Apparatus according to claim 16 in which the predetermined direction is towards a predetermined position.

18. Apparatus according to claim 17 wherein the biasing means comprises a pair of oppositely acting biasing means.

19. Apparatus according to the claim 1, further comprising means for combining a pair of diffracted beams to produce interference, the diffracted beams having different polarizations, the means comprising a beam splitter arranged to produce a reflected output and a transmitted output, further comprising means for producing a signal responsive to the difference between said outputs.

20. Apparatus according to claim 19 wherein said difference means comprises a pair of opto-electric transducers for generating respective electric signals and means receiving said electrical signals and producing an electrical output signal proportional to the difference therebetween.

21. Apparatus according to claim 1, further comprising fringe counting apparatus for receiving the output of the interferometer comprising means for receiving a zero mean output signal therefrom, and means for detecting zero crossings thereof.

22. Apparatus according to claim 21, further comprising means for receiving a second input signal of different phase to the first, means for determining from said first and second signals the phase of said zero crossing, means for determining the direction of said crossing, and means for incrementing or decrementing a fringe count in dependence upon said direction and said phase.

23. Interferometer apparatus comprising:
light beam source means for providing a light beam;
a diffraction grating for receiving the light beam from the light beam source means to produce first and second diffracted beams of equal and opposite order; and
a prism comprising
a central place for reflecting light in a first polarization plane and transmitting light in a second polarization plane,
a surface for receiving the first and second diffracted beams from the diffraction grating,
a pair of first and second side surfaces symmetrically disposed about the central plane for reflecting the first and second diffracted beams respectively to the central plane whereby a first combined beam is formed by a first polarization plane light of the first reflected diffracted beam reflected by the central plane and a second polarization plane light of the second reflected diffracted beam transmitted by the central plane and a second combined beam is formed by the second polarization plane light of the first reflected diffracted beam transmitted by the central plane and the first polarization plane light of the second reflected diffracted beam reflected by the central plane,
a first exit face for allowing the first combined beam to pass from the prism to a first analyzer, and
a second exit face for allowing the second combined beam to pass from the prism to a second analyzer, and
wherein the light beam source means is positioned to direct the light beam along a direction parallel to the central plane of the prism so that the light beam is incident on the diffraction grating without prior reflection within the prism.

24. Apparatus according to claim 23, wherein the optical path lengths to the central plane from the grating are substantially equal.

25. Apparatus according to claim 23, wherein the prism geometry and refractive index are such that the reflection from the surfaces is total internal reflection.

26. Apparatus according to claim 23 wherein the reflective surfaces are parallel.

27. Apparatus according to claim 23 wherein the prism geometry and refractive index are such that the angles of incidence and reflection are approximately 45°.

28. Apparatus according to claim 23, wherein said central plane comprises a dichroic layer.

29. Apparatus according to claim 28 wherein the angle of incidence of the beam thereon is approximately 45°.

30. Apparatus for measuring position, surface or texture comprising:
a probe means for contacting a surface; and
measurement means for measuring the probe position, further comprising biasing means arranged to exert a force on the probe so as to damp vibrations thereof and means for controlling the force exerted on the probe means for causing the force exerted on the probe means to be related to the velocity of the probe means.

31. Apparatus according to claim 30 wherein the biasing means comprises an electromagnetic actuator.

32. Apparatus according to claim 31 wherein the actuator comprises a coil surrounding a core piece.

33. Apparatus for processing signals derived from the output of an interferometer, to produce an output signal related to the angular position between interference fringes of the output of the interferometer, which comprises means for generating an estimated signal related to said angular position, means for generating said output signal in dependence upon said estimated signal, means for generating from said estimated signal a function thereof, and means for controlling said estimated signal generator in dependence upon said generated function signal and the input signal to reduce the difference therebetween.

34. Apparatus according to claim 33, wherein said estimated signal is a digital signal, and said function generating means comprises digital to analog converter means.

35. Apparatus according to claim 33 wherein said estimated signal is a digital signal, in which the control means comprises means for altering the value of said digital signal by one count when said difference signal exceeds a predetermined threshold so as to reduce said difference signal.

36. Apparatus according to claim 35 wherein said predetermined threshold is constant, and said difference signal is, at least approximately, linearly related to said angular position.

37. Apparatus according to claim 36, wherein the difference signal approximates the sine of the difference between the estimated signal and the input signal.

38. Apparatus according to claim 33 in which the control means are arranged not to vary the estimated signal in the absence of a variation in the input signal, so as to extend the frequency range of the apparatus to DC operation.

39. Apparatus according to claim 33 arranged to receive a pair of input signals of differing phase.

40. Apparatus according to claim 39 in which said pair of signals comprise sine and cosine signals differing in phase by 90°.

41. Apparatus according to claim 40 comprising means for generating estimated sine and cosine signals, means for producing product signals corresponding to the products of said estimated sine and cosine signals and said input cosine and sine signals respectively, and means for generating from the difference therebetween a signal representing the angular position difference between said input signals and said estimated signals, to control said estimated signal generating means.

42. Apparatus according to claim 41, wherein said estimated signal generating means comprises digital signal generating means, and said multiplying means comprises multiplying digital to analog converters.

43. Apparatus according to claim 33 further comprising means for counting interference fringes or maxima detected in said output signal.

44. Apparatus according to claim 43, further comprising means for synchronizing said estimated signal generator from said counter.

* * * * *

UNITED STATES PATENT AND TRADEMARK OFFICE
CERTIFICATE OF CORRECTION

PATENT NO. : 5,517,307

DATED : May 14, 1996

INVENTOR(S) : Buehring et al.

It is certified that error appears in the above-identified patent and that said Letters Patent is hereby corrected as shown below:

Column 22, line 22, "F(100)." should read --F($\phi$).

Signed and Sealed this

Tenth Day of September, 1996

Attest:

BRUCE LEHMAN

Attesting Officer     Commissioner of Patents and Trademarks